(12) United States Patent
Agiwal et al.

(10) Patent No.: US 11,930,490 B2
(45) Date of Patent: Mar. 12, 2024

(54) METHOD AND APPARATUS FOR IDLE MODE OPERATION IN WIRELESS COMMUNICATION SYSTEM

(71) Applicant: Samsung Electronics Co., Ltd., Suwon-si (KR)

(72) Inventors: Anil Agiwal, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/215,516

(22) Filed: Mar. 29, 2021

(65) Prior Publication Data

US 2021/0314979 A1 Oct. 7, 2021

Related U.S. Application Data

(60) Provisional application No. 63/004,309, filed on Apr. 2, 2020, provisional application No. 63/003,448, filed on Apr. 1, 2020.

(51) Int. Cl.
*H04W 72/1268* (2023.01)
*H04L 5/00* (2006.01)
(Continued)

(52) U.S. Cl.
CPC ....... *H04W 72/1268* (2013.01); *H04L 5/0032* (2013.01); *H04W 72/044* (2013.01); *H04W 72/21* (2023.01); *H04W 88/06* (2013.01)

(58) Field of Classification Search
CPC ..... H04B 7/0695; H04L 5/001; H04L 5/0032; H04L 5/0053; H04W 72/044;
(Continued)

(56) References Cited

U.S. PATENT DOCUMENTS 11,362,722 B2 * 6/2022 Lin ...................... H04W 76/19
2012/0307755 A1 * 12/2012 Kim ...................... H04L 1/1825
370/329
(Continued)

FOREIGN PATENT DOCUMENTS

KR 10-2020-0015752 A 2/2020

OTHER PUBLICATIONS

U.S. Appl. No. 63/002,876 (Year: 2020).*
(Continued)

*Primary Examiner* — Dung B Huynh
(74) *Attorney, Agent, or Firm* — Jefferson IP Law, LLP

(57) ABSTRACT

The disclosure relates to a communication method and system for converging a $5^{th}$-Generation (5G) communication system for supporting higher data rates beyond a $4^{th}$-Generation (4G) system with a technology for Internet of Things (IoT). The disclosure may be applied to intelligent services based on the 5G communication technology and the IoT-related technology, such as a smart home, a smart building, a smart city, a smart car, a connected car, health care, digital education, a smart retail, security and safety services. A method and an apparatus for an RRC idle mode related operations in wireless communication system are provided.

20 Claims, 14 Drawing Sheets

(51) Int. Cl.
*H04W 72/044* (2023.01)
*H04W 72/21* (2023.01)
*H04W 88/06* (2009.01)

(58) Field of Classification Search
CPC ......... H04W 72/1268; H04W 72/1284; H04W 76/19; H04W 88/06
See application file for complete search history.

(56) References Cited

U.S. PATENT DOCUMENTS

| | | | | |
|---|---|---|---|---|
| 2018/0323940 | A1* | 11/2018 | Rico Alvarino | H04L 27/34 |
| 2019/0097779 | A1* | 3/2019 | Wu | H04L 1/1858 |
| 2019/0159165 | A1 | 5/2019 | Agiwal et al. | |
| 2019/0238287 | A1* | 8/2019 | Zhou | H04W 52/34 |
| 2020/0177266 | A1* | 6/2020 | Kang | H04L 5/0055 |
| 2020/0196327 | A1* | 6/2020 | Zhang | H04W 28/0268 |
| 2020/0267797 | A1* | 8/2020 | Wei | H04W 72/23 |
| 2020/0350973 | A1* | 11/2020 | Cirik | H04W 72/1284 |
| 2020/0374853 | A1* | 11/2020 | Guan | H04B 7/0695 |
| 2020/0383167 | A1* | 12/2020 | Sengupta | H04W 74/0833 |
| 2021/0013949 | A1* | 1/2021 | Agiwal | H04W 74/0808 |
| 2021/0028848 | A1* | 1/2021 | Tsai | H04B 7/088 |
| 2021/0028849 | A1* | 1/2021 | Chin | H04W 72/1268 |
| 2021/0028853 | A1* | 1/2021 | Wu | H04B 7/0626 |
| 2021/0029724 | A1* | 1/2021 | Tsai | H04W 72/569 |
| 2021/0036822 | A1* | 2/2021 | Lyu | H04L 5/0048 |
| 2021/0050897 | A1* | 2/2021 | Huang | H04L 5/0055 |
| 2021/0050901 | A1* | 2/2021 | Chin | H04W 72/046 |
| 2021/0083751 | A1* | 3/2021 | Chen | H04W 76/19 |
| 2021/0100031 | A1* | 4/2021 | Cirik | H04W 76/19 |
| 2021/0105058 | A1* | 4/2021 | Lin | H04W 76/19 |
| 2021/0105101 | A1* | 4/2021 | Wei | H04L 1/1812 |
| 2021/0105176 | A1* | 4/2021 | Tsai | H04W 72/23 |
| 2021/0105827 | A1* | 4/2021 | Tsai | H04W 72/62 |
| 2021/0144762 | A1* | 5/2021 | Tsai | H04W 74/0808 |
| 2021/0175955 | A1* | 6/2021 | Kung | H04W 80/02 |
| 2021/0218457 | A1* | 7/2021 | Xu | H04B 7/088 |
| 2021/0218458 | A1* | 7/2021 | Kung | H04W 80/02 |
| 2021/0235292 | A1* | 7/2021 | Zhang | H04B 7/063 |
| 2021/0258966 | A1* | 8/2021 | Yoshioka | H04W 72/21 |
| 2021/0297959 | A1* | 9/2021 | Zhou | H04W 72/23 |
| 2021/0307027 | A1* | 9/2021 | Kung | H04W 72/569 |
| 2021/0352721 | A1* | 11/2021 | Zhang | H04W 72/21 |
| 2021/0385846 | A1* | 12/2021 | Lee | H04W 80/02 |
| 2022/0039077 | A1* | 2/2022 | Koskela | H04W 72/23 |
| 2022/0052749 | A1* | 2/2022 | Guo | H04W 76/19 |
| 2022/0095265 | A1* | 3/2022 | Cha | H04L 5/0048 |
| 2022/0104279 | A1* | 3/2022 | Yamamoto | H04W 74/0833 |
| 2022/0109486 | A1* | 4/2022 | Fu | H04W 72/1263 |
| 2022/0109547 | A1* | 4/2022 | Svedman | H04L 5/0091 |
| 2022/0110159 | A1* | 4/2022 | Shi | H04W 72/044 |
| 2022/0116959 | A1* | 4/2022 | Li | H04W 72/52 |
| 2022/0123823 | A1* | 4/2022 | Dong | H04B 7/088 |
| 2022/0124784 | A1* | 4/2022 | Kang | H04L 5/0094 |
| 2022/0183079 | A1* | 6/2022 | Ouchi | H04W 74/0841 |
| 2022/0209840 | A1* | 6/2022 | You | H04W 72/21 |
| 2022/0217588 | A1* | 7/2022 | You | H04W 36/0055 |
| 2022/0240282 | A1* | 7/2022 | Shi | H04W 72/1268 |
| 2022/0272760 | A1* | 8/2022 | Murray | H04W 74/0833 |
| 2022/0295589 | A1* | 9/2022 | Tsai | H04B 17/309 |
| 2022/0345284 | A1* | 10/2022 | Kim | H04L 5/0053 |
| 2022/0360307 | A1* | 11/2022 | Matsumura | H04L 1/0026 |
| 2022/0368403 | A1* | 11/2022 | Tang | H04B 7/088 |
| 2022/0400396 | A1* | 12/2022 | Alfarhan | H04W 74/0808 |
| 2023/0028843 | A1* | 1/2023 | Sun | H04W 52/365 |

OTHER PUBLICATIONS

U.S. Appl. No. 62/877,257 (Year: 2019).*
U.S. Appl. No. 62/909,833 (Year: 2019).*
Asia Pacific Telecom Co., Ltd., Remaining issues on SCell BFR procedure, R2-2001421, 3GPP TSG RAN WG2 Meeting #109 electronic, section 2.2, Feb. 14, 2020, Elbonia.
Samsung, Offline Discussion 112: Beam Management Enhancements, R2-2001678, 3GPP TSG RAN WG2 Meeting #109e, section 2.1.1, Mar. 11, 2020, Athens, Greece.
LG Electronics Inc., Consideration on Truncated format on SCell BFR MAC CE, R2-2001304, 3GPP TSG RAN WG2 Meeting #109e, section 2, Feb. 14, 2020, Online.
Nokia et al., BFR on dormant SCell, R2-2000679, 3GPP TSG RAN WG2 Meeting #109e, section 2, Feb. 14, 2020, Elbonia.
International Search Report dated Jul. 5, 2021, issued in International Application No. PCT/KR2021/003822.
"3rd Generation Partnership Project; Technical Specification Group Radio Access Network; NR; Medium Access Control (MAC) protocol specification (Release 16)", 3GPP TS 38.321 VI 6.0.0, Mar. 1, 2020 (Mar. 1, 2020), XP055877597.
SAMSUNG: "Introduction of eMIMO for NR", R2-2001897, 3GPP TSG-RAN WG2 Meeting #109 electronic, Elbonia, Feb. 24-Mar. 6, 2020.
European Search Report dated Jul. 10, 2023, issued in European Application No. 21779560.8.

* cited by examiner

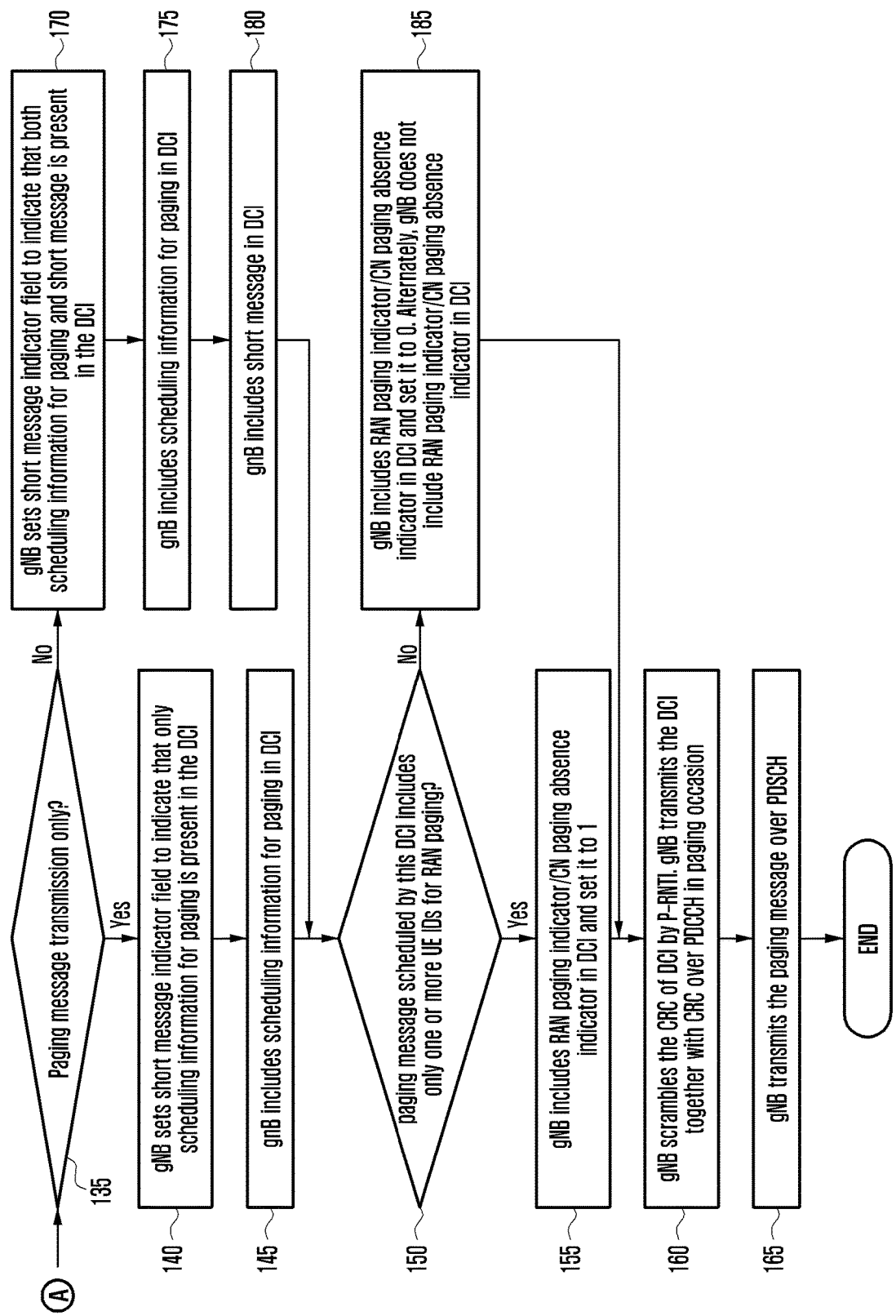

METHOD AND APPARATUS FOR IDLE MODE OPERATION IN WIRELESS COMMUNICATION SYSTEM

CROSS-REFERENCE TO RELATED APPLICATION(S)

This application is based on and claims priority under 35 U.S.C. § 119(e) of a U.S. Provisional application Ser. No. 63/003,448, filed on Apr. 1, 2020, in the U.S. Patent and Trademark Office, and of a U.S. Provisional application Ser. No. 63/004,309, filed on Apr. 2, 2020, in the U.S. Patent and Trademark Office, the disclosure of each of which is incorporated by reference herein in its entirety.

BACKGROUND

1. Field

The disclosure relates to a wireless communication system. More particularly, the disclosure relates to an apparatus, a method, and a system for radio resource control (RRC) idle mode related operations in wireless communication system.

2. Description of Related Art

To meet the demand for wireless data traffic having increased since deployment of $4^{th}$ Generation (4G) communication systems, efforts have been made to develop an improved $5^{th}$ Generation (5G) or pre-5G communication system. Therefore, the 5G or pre-5G communication system is also called a 'Beyond 4G Network' or a 'Post long term evolution (LTE) System'. The 5G communication system is considered to be implemented in higher frequency (mm-Wave) bands, e.g., 60 GHz bands, so as to accomplish higher data rates. To decrease propagation loss of the radio waves and increase the transmission distance, the beamforming, a massive multiple-input multiple-output (MIMO), a full dimensional MIMO (FD-MIMO), an array antenna, an analog beam forming, large scale antenna techniques are discussed in 5G communication systems. In addition, in 5G communication systems, development for system network improvement is underway based on advanced small cells, cloud radio access networks (RANs), ultra-dense networks, a device-to-device (D2D) communication, a wireless backhaul, a moving network, a cooperative communication, coordinated multi-points (CoMP), a reception-end interference cancellation, and the like. In the 5G system, hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies, such as a sensor network, machine type communication (MTC), and machine-to-machine (M2M) communication may be implemented by beamforming, MIMO, and array antennas. Application of a cloud radio access network (RAN) as the above-described Big Data processing technology may also be considered to be as an example of convergence between the 5G technology and the IoT technology.

Recently, there are needs to enhance current RRC idle mode operation (e.g., power consumption minimization, paging monitoring, or the like) for wireless communication system.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a communication method and system for converging a fifth generation (5G) communication system for supporting higher data rates beyond a fourth generation (4G).

Additional aspects will be set forth in part in the description which follows and, in part, will be apparent from the description, or may be learned by practice of the presented embodiments.

In accordance with an aspect of the disclosure, a method performed by a terminal is provided. The method includes determining that a beam failure recovery (BFR) for a serving cell is triggered and is not cancelled, identifying whether an uplink shared channel (UL-SCH) resource for a new transmission is able to accommodate a medium access control (MAC) control element (CE) associated with the BFR, and triggering a scheduling request (SR) for the BFR for the serving cell, in case that the UL-SCH resource is not able to accommodate the MAC CE associated with the BFR.

In accordance with another aspect of the disclosure, a terminal is provided. The terminal includes a transceiver configured to transmit and receive a signal, and at least one processor configured to determine that a BFR for a serving cell is triggered and is not cancelled, identify whether an UL-SCH resource for a new transmission is able to accommodate a MAC CE associated with the BFR, and trigger an SR for the BFR for the serving cell, in case that the UL-SCH resource is not able to accommodate the MAC CE associated with the BFR.

In accordance with another aspect of the disclosure, a method performed by a base station is provided. The method includes transmitting, to a terminal, information for an UL-SCH resource for a new transmission, and receiving, from the terminal, an SR for a BFR for a serving cell, in case that the UL-SCH resource is not able to accommodate a MAC CE associated with the BFR.

In accordance with another aspect of the disclosure, a base station is provided. The base station includes a transceiver configured to transmit and receive a signal, and at least one processor configured to transmit, to a terminal, information for an UL-SCH resource for a new transmission, and receive, from the terminal, an SR for a BFR for a serving cell, in case that the UL-SCH resource is not able to accommodate a MAC CE associated with the BFR.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 1A and 1B illustrate a flowchart of transmitting a short message or a paging message according to various embodiments of the disclosure;

Throughout the drawings, like reference numerals will be understood to refer to like parts, components, and structures.

DETAILED DESCRIPTION

Figure 1A:
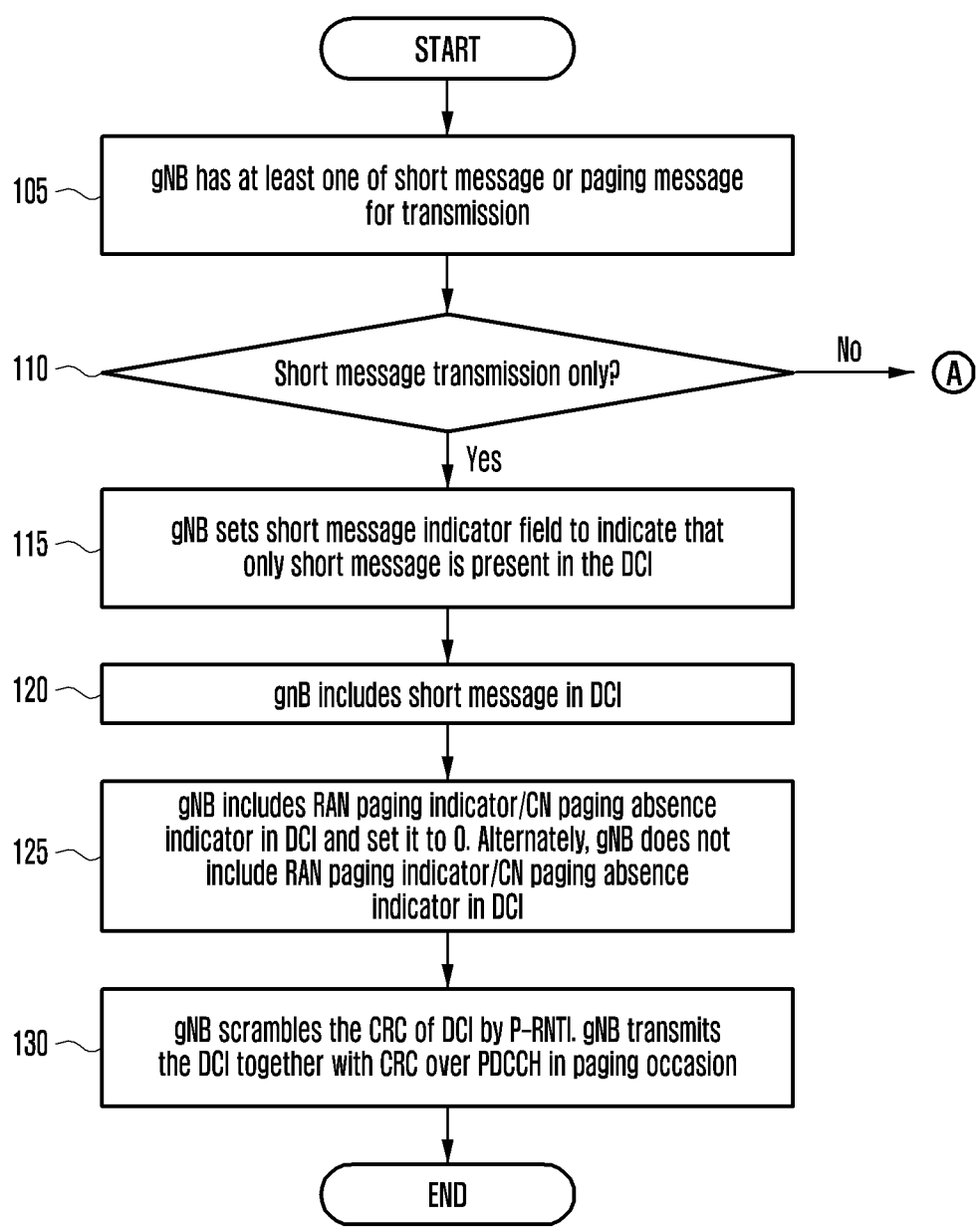

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit", "module" or the like may refer to a software component or hardware component, such as, for example, a field-programmable gate array (FPGA) or an application-specific integrated circuit (ASIC) capable of carrying out a function or an operation. However, a "unit", or the like, is not limited to hardware or software. A unit, or the like, may be configured so as to reside in an addressable storage medium or to drive one or more processors. Units, or the like, may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Prior to the detailed description, terms or definitions necessary to understand the disclosure are described. However, these terms should be construed in a non-limiting way.

The "base station (BS)" is an entity communicating with a user equipment (UE) and may be referred to as BS, a base transceiver station (BTS), a node B (NB), an evolved NB (eNB), an access point (AP), a 5G NB (5GNB), or a next generation node B (gNB).

The "terminal" is an entity communicating with a BS and may be referred to as a user equipment (UE), a device, a mobile station (MS), a mobile equipment (ME), or the like.

In the recent years several broadband wireless technologies have been developed to meet the growing number of broadband subscribers and to provide more and better applications and services. The second generation wireless communication system has been developed to provide voice services while ensuring the mobility of users. Third generation wireless communication system supports not only the voice service but also data service. In recent years, the fourth wireless communication system has been developed to provide high-speed data service. However, currently, the fourth generation wireless communication system suffers from lack of resources to meet the growing demand for high speed data services. Accordingly, fifth generation wireless communication system (also referred to as a next generation radio or new radio (NR)) is being developed to meet the growing demand for high speed data services, support ultra-reliability and low latency applications.

In the fifth generation wireless communication system operating in higher frequency (mmWave) bands, the UE and the gNB communicates with each other using Beamforming. Beamforming techniques are used to mitigate the propagation path losses and to increase the propagation distance for communication at higher frequency band. Beamforming enhances the transmission and reception performance using a high-gain antenna. Beamforming can be classified into transmission (TX) beamforming performed in a transmitting end and reception (RX) beamforming performed in a receiving end. In general, the TX beamforming increases directivity by allowing an area in which propagation reaches to be densely located in a specific direction by using a plurality of antennas. In this situation, aggregation of the plurality of antennas can be referred to as an antenna array, and each antenna included in the array can be referred to as an array element. The antenna array can be configured in various forms, such as a linear array, a planar array, or the like. The use of the TX beamforming results in the increase in the directivity of a signal, thereby increasing a propagation distance. Further, since the signal is almost not transmitted in a direction other than a directivity direction, a signal interference acting on another receiving end is significantly decreased. The receiving end can perform beamforming on a RX signal by using a RX antenna array. The RX beamforming increases the RX signal strength transmitted in a specific direction by allowing propagation to be concentrated in a specific direction, and excludes a signal transmitted in a direction other than the specific direction from the RX signal, thereby providing an effect of blocking an interference signal. By using beamforming technique, a transmitter can make plurality of transmit beam patterns of different directions. Each of these transmit beam patterns can also be referred to as a TX beam. Wireless communication system operating at high frequency uses plurality of narrow TX beams to transmit signals in the cell as each narrow TX beam provides coverage to a part of cell. The narrower the TX beam, higher is the antenna gain and hence the larger the propagation distance of signal transmitted using beamforming. A receiver can also make plurality of RX beam patterns of different directions. Each of these receive patterns can also be referred to as a RX beam.

The fifth generation wireless communication system, supports standalone mode of operation as well dual connectivity (DC). In DC a multiple Rx/Tx UE may be configured to utilize resources provided by two different nodes (or NBs) connected via non-ideal backhaul. One node acts as the master node (MN) and the other as the secondary node (SN). The MN and SN are connected via a network interface and at least the MN is connected to the core network. NR also supports multi-radio access technology (RAT) dual connectivity (MR-DC) operation whereby a UE in RRC_CONNECTED is configured to utilize radio resources provided by two distinct schedulers, located in two different nodes connected via a non-ideal backhaul and providing either evolved universal terrestrial radio access (E-UTRA) (i.e., if the node is ng-eNB) or NR access (i.e., if the node is a gNB). In NR, for a UE in RRC_CONNECTED not configured with carrier aggregation (CA)/dual connectivity (DC), there is only one serving cell comprising of the primary cell. For a UE in RRC_CONNECTED configured with CA/DC, the term 'serving cells' is used to denote the set of cells comprising of the special cell(s) and all secondary cells. In NR, the term master cell group (MCG) refers to a group of serving cells associated with the master node, comprising of the primary cell (PCell) and optionally one or more secondary cells (SCells). In NR, the term secondary cell group (SCG) refers to a group of serving cells associated with the secondary node, comprising of the primary SCG cell (PSCell) and optionally one or more SCells. In NR, PCell refers to a serving cell in MCG, operating on the primary frequency, in which the UE either performs the initial connection establishment procedure or initiates the connection re-establishment procedure. In NR, for a UE configured with CA, a SCell is a cell providing additional radio resources on top of special cell. PSCell refers to a serving cell in SCG in which the UE performs a random access (RA) when performing the Reconfiguration with Sync procedure. For a dual connectivity operation, the term special cell (SpCell) refers to the PCell of the MCG or the PSCell of the SCG. Otherwise, the term special cell refers to the PCell.

In the fifth generation wireless communication system, a node B (or a gNB) or a base station in cell broadcast synchronization signal and physical broadcast channel (PBCH) block (SSB) consists of primary synchronization signals (PSS) and secondary synchronization signal (SSS) and system information. System information includes common parameters needed to communicate in cell. In the fifth generation wireless communication system (or NR), system information (SI) is divided into the master information block (MIB) and a number of system information blocks (SIBs) where:

the MIB is always transmitted on the PBCH with a periodicity of 80 ms and repetitions made within 80 ms and it includes parameters that are needed to acquire SIB1 from the cell.

the SIB1 is transmitted on the downlink shared channel (DL-SCH) with a periodicity of 160 ms and variable transmission repetition. The default transmission repetition periodicity of SIB1 is 20 ms but the actual transmission repetition periodicity is up to network implementation. SIB1 includes information regarding the availability and scheduling (e.g., mapping of SIBs to SI message, periodicity, SI-window size) of other SIBs with an indication whether one or more SIBs are only provided on-demand and, in that case, the configuration needed by the UE to perform the SI request. SIB1 is cell-specific SIB;

SIBs other than SIB1 are carried in system information (SI) messages, which are transmitted on the DL-SCH. Only SIBs having the same periodicity can be mapped to the same SI message.

In the fifth generation wireless communication system, a physical downlink control channel (PDCCH) is used to schedule DL transmissions on physical downlink shared channel (PDSCH) and UL transmissions on physical uplink shared channel (PUSCH), where the downlink control information (DCI) on PDCCH includes downlink assignments containing at least modulation and coding format, resource allocation, and hybrid-automatic repeat request (HARQ) information related to DL-SCH, uplink scheduling grants containing at least modulation and coding format, resource allocation, and hybrid-ARQ information related to uplink shared channel (UL-SCH). In addition to scheduling, PDCCH can be used to for activation and deactivation of configured PUSCH transmission with configured grant, activation and deactivation of PDSCH semi-persistent transmission, notifying one or more UEs of the slot format, notifying one or more UEs of the physical resource block(s) (PRB(s)) and orthogonal frequency divisional multiplexing (OFDM) symbol(s) where the UE may assume no transmission is intended for the UE, transmission of transmission power control (TPC) commands for physical uplink control channel (PUCCH) and PUSCH, transmission of one or more TPC commands for sounding reference signal (SRS) transmissions by one or more UEs, switching a UE's active bandwidth part, initiating an RA procedure. A UE monitors a set of PDCCH candidates in the configured monitoring occasions in one or more configured control resource SETs (CORESETs) according to the corresponding search space configurations. A CORESET consists of a set of PRBs with a time duration of 1 to 3 OFDM symbols. The resource units resource element groups (REGs) and control channel elements (CCEs) are defined within a CORESET with each CCE consisting a set of REGs. Control channels are formed by aggregation of CCE. Different code rates for the control channels are realized by aggregating different number of CCE. Interleaved and non-interleaved CCE-to-REG mapping are supported in a CORESET. Polar coding is used for PDCCH. Each resource element group carrying PDCCH carries its own demodulation reference signal (DMRS). Quadrature phase shift keying (QPSK) modulation is used for PDCCH.

In fifth generation wireless communication system, a list of search space configurations are signaled by gNB for each configured bandwidth part (BWP) wherein each search configuration is uniquely identified by an identifier. An identifier of a search space configuration to be used for a specific purpose, such as paging reception, SI reception, random access response reception is explicitly signaled by the gNB. In NR, search space configuration comprises of parameters Monitoring-periodicity-PDCCH-slot, Monitoring-offset-PDCCH-slot, Monitoring-symbols-PDCCH-within-slot and duration. A UE determines PDCCH monitoring occasion(s) within a slot using the parameters PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot). A PDCCH monitoring occasions are there in slots 'x' to x+duration where the slot with number 'x' in a radio frame with number 'y' satisfies the Equation 1 below:

$$(y*(\text{number of slots in a radio frame})+x-\text{Monitoring-offset-PDCCH-slot}) \mod (\text{Monitoring-periodicity-PDCCH-slot})=0 \quad \text{Equation 1}$$

The starting symbol of a PDCCH monitoring occasion in each slot having PDCCH monitoring occasion is given by Monitoring-symbols-PDCCH-within-slot. The length (in symbols) of a PDCCH monitoring occasion is given in the corset associated with the search space. Search space configuration includes the identifier of CORESET configuration associated with it. A list of CORESET configurations are signaled by the gNB for each configured BWP wherein each CORESET configuration is uniquely identified by an identifier. Note that each radio frame is of 10 ms duration. Radio frame is identified by a radio frame number or system frame number. Each radio frame comprises of several slots wherein the number of slots in a radio frame and duration of slots depends on sub carrier spacing. The number of slots in a radio frame and duration of slots depends radio frame for each supported subcarrier spacing (SCS) is pre-defined in NR. Each CORESET configuration is associated with a list of transmission configuration indicator (TCI) states. One downlink (DL) reference signal (RS) identifier (ID) (e.g., SSB or channel state information reference signal (CSI-RS)) is configured per transmission configuration indicator (TCI) state. The list of TCI states corresponding to a CORESET configuration is signaled by the gNB via RRC signaling. One of the TCI state in TCI state list is activated and indicated to the UE by the gNB. TCI state indicates the DL TX beam (DL TX beam is quasi-collocated (QCLed) with SSB/CSI-RS of TCI state) used by the gNB for transmission of PDCCH in the PDCCH monitoring occasions of a search space.

In fifth generation wireless communication system bandwidth adaptation (BA) is supported. With BA, the receive and transmit bandwidth of a UE need not be as large as the bandwidth of the cell and can be adjusted the width can be ordered to change (e.g., to shrink during period of low activity to save power), the location can move in the frequency domain (e.g., to increase scheduling flexibility), and the subcarrier spacing can be ordered to change (e.g., to allow different services). A subset of the total cell bandwidth of a cell is referred to as a BWP. BA is achieved by configuring RRC connected UE with BWP(s) and telling the UE which of the configured BWPs is currently the active one. When BA is configured, the UE only has to monitor PDCCH on the one active BWP, i.e., it does not have to monitor PDCCH on the entire DL frequency of the serving cell. In RRC connected state, the UE is configured with one or more DL and UL BWPs, for each configured serving cell (i.e., a PCell or a SCell). For an activated serving cell, there is always one active UL and DL BWP at any point in time. The BWP switching for a serving cell is used to activate an inactive BWP and deactivate an active BWP at a time. The BWP switching is controlled by the PDCCH indicating a downlink assignment or an uplink grant, by the bwp-InactivityTimer, by RRC signaling, or by the MAC entity itself upon initiation of a random access procedure. Upon addition of SpCell or activation of an SCell, the DL BWP and UL BWP indicated by firstActiveDownlinkBWP-Id and firstActiveUplinkBWP-Id respectively is active without receiving PDCCH indicating a downlink assignment or an uplink grant. The active BWP for a serving cell is indicated by either RRC or PDCCH. For unpaired spectrum, a DL BWP is paired with a UL BWP, and BWP switching is common for both UL and DL. Upon expiry of BWP inactivity timer, the UE switches to the active DL BWP to the default DL BWP or initial DL BWP (if default DL BWP is not configured).

In the 5G wireless communication system, a random access (RA) is supported. A random access (RA) is used to achieve uplink (UL) time synchronization. A RA is used during an initial access, a handover, an RRC connection a re-establishment procedure, a scheduling request transmission, an SCG addition/modification, a beam failure recovery and data or control information transmission in UL by non-synchronized UE in RRC CONNECTED state. Several types of RA procedure is supported.

Contention based random access (CBRA): This is also referred to as 4 step CBRA. In this type of random access, the UE first transmits a random access preamble (also referred to as Msg1) and then waits for a random access response (RAR) in the RAR window. The RAR is also referred to as Msg2. The gNB transmits the RAR on PDSCH. PDCCH scheduling the PDSCH carrying RAR is addressed to RA-radio network temporary identifier (RA-RNTI). The RA-RNTI identifies the time-frequency resource (also referred to as a physical RA channel (PRACH) occasion or a PRACH TX occasion or RA channel (RACH) occasion) in which RA preamble was detected by the gNB. The RA-RNTI is calculated as follows: RA-RNTI=$1+s\_id+14*t\_id+14*80*f\_id+14*80*8*ul\_carrier\_id$, where s_id is the index of the first OFDM symbol of the PRACH occasion where the UE has transmitted Msg1, i.e., an RA preamble; $0 \le s\_id<14$; t_id is the index of the first slot of the PRACH occasion ($0 \le t\_id<80$); f_id is the index of the PRACH occasion within the slot in the frequency domain ($0 \le f\_id<8$), and ul_carrier_id is the UL carrier used for Msg 1 transmission (0 for normal UL (NUL) carrier and 1 for supplementary UL (SUL) carrier. Several RARs for various Random access preambles detected by the gNB can be multiplexed in the same RAR MAC protocol data unit (PDU) by the gNB. An RAR in MAC PDU corresponds to the UE's RA preamble transmission if the RAR includes an RA preamble identifier (RAPID) of RA preamble transmitted by the UE. If the RAR corresponding to its RA preamble transmission is not received during the RAR window and the UE has not yet transmitted the RA preamble for a configurable (configured by the gNB in RACH configuration) number of times, the UE goes back to first step, i.e., a select random access resource (preamble/RACH occasion) and transmits the RA preamble. A backoff may be applied before going back to first step.

If the RAR corresponding to its RA preamble transmission is received the UE transmits message 3 (Msg3) in UL grant received in RAR. Msg3 includes a message, such as an RRC connection request, an RRC connection re-establishment request, an RRC handover confirm, a scheduling request, an SI request, or the like. It may include the UE identity (i.e., a cell-radio network temporary identifier (C-RNTI) or system architecture evolution (SAE)-temporary mobile subscriber identity (S-TMSI) or a random number). After transmitting the Msg3, the UE starts a contention resolution timer. While the contention resolution timer is running, if the UE receives a PDCCH addressed to C-RNTI included in Msg3, contention resolution is considered successful, contention resolution timer is stopped and RA procedure is completed. While the contention resolution timer is running, if the UE receives contention resolution MAC control element (CE) including the UE's contention resolution identity (first X bits of common control channel (CCCH) service data unit (SDU) transmitted in Msg3), contention resolution is considered successful, contention resolution timer is stopped and RA procedure is completed. If the contention resolution timer expires and the UE has not yet transmitted the RA preamble for a configurable number of times, the UE goes back to first step, i.e., a select random access resource (preamble/RACH occasion) and transmits the RA preamble.

A backoff is applied before going back to first step if backoff index is received in RAR after transmitting the PRACH preamble. The UE retransmits PRACH preamble after a time period which is randomly selected between 0 and SCALING_FACTOR_BI*backoff value, where SCALING_FACTOR_BI is set to 1 or scalingFactorBI. scalingFactorBI is optionally signaled by the gNB. The backoff value corresponding to backoff index received in RAR, is obtained by the UE from a pre-defined backoff table. During the PRACH preamble retransmission UE also ramps up the power by PowerRampingStep or powerRampingStepHighPriority. PowerRampingStep or powerRampingStepHighPriority is signaled by the gNB. PowerRampingStep is configured in RACH configuration in SI and dedicated signaling and is cell specific. powerRampingStepHighPriority is dedicatedly configured to the UE separately for RA initiated for beam failure recovery configuration and RA initiated for handover. If RA procedure is initiated for beam failure recovery and powerRampingStepHighPriority is not configured by the gNB for beam failure recovery, the UE uses PowerRampingStep. If RA procedure is initiated for handover and powerRampingStepHighPriority is not configured by the gNB for handover, the UE uses PowerRampingStep. scalingFactorBI is dedicatedly configured to the UE separately for RA initiated for beam failure recovery configuration and RA initiated for handover. If an RA procedure is initiated for beam failure recovery and scalingFactorBI is not configured by the gNB for beam failure recovery, the UE sets SCALING_FACTOR_BI to 1. Otherwise, SCALING_FACTOR_BI is set to scalingFactorBI. If RA procedure is initiated for handover and scalingFactorBI is not configured by the gNB for handover, the UE sets SCALING_FACTOR_BI to 1. Otherwise, SCALING_FACTOR_BI is set to scalingFactorBI.

Contention free random access (CFRA): This is also referred to as legacy CFRA or 4 step CFRA. CFRA procedure is used for scenarios, such as handover where low latency is required, timing advance establishment for secondary cell (SCell), or the like. An evolved node B (eNB) assigns to the UE a dedicated Random access preamble. The UE transmits the dedicated RA preamble. The ENB transmits the RAR on PDSCH addressed to RA-RNTI. RAR conveys RA preamble identifier and timing alignment information. The RAR may also include a UL grant. The RAR is transmitted in a RAR window similar to a CBRA procedure. The CFRA is considered successfully completed after receiving the RAR including RAPID of RA preamble transmitted by the UE. In case RA is initiated for beam failure recovery, CFRA is considered successfully completed if PDCCH addressed to C-RNTI is received in search space for beam failure recovery. If the RAR window expires and RA is not successfully completed and the UE has not yet transmitted the RA preamble for a configurable (configured by the gNB in RACH configuration) number of times, the UE retransmits the RA preamble.

For certain events such has handover and beam failure recovery if dedicated preamble(s) are assigned to the UE, during first step of a random access, i.e., during a random access resource selection for Msg1 transmission the UE determines whether to transmit dedicated preamble or non-dedicated preamble. Dedicated preambles is typically provided for a subset of SSBs/CSI-RSs. If there is no SSB/CSI-RS having DL reference signal received power (RSRP) above a threshold amongst the SSBs/CSI-RSs for which contention free random access resources (i.e., dedicated preambles/ROs) are provided by the gNB, the UE select non dedicated preamble. Otherwise, the UE select dedicated preamble. So during the RA procedure, one random access attempt can be CFRA while other random access attempt can be CBRA.

If a random access attempt is not successful, before the next random access attempt based on contention based random access, the UE performs backoff if backoff index is received in RAR after transmitting the PRACH preamble during the random access attempt. The UE retransmits PRACH preamble after a time period which is randomly selected between 0 and SCALING_FACTOR_BI*backoff value, where SCALING_FACTOR_BI is set to 1 or scalingFactorBI. scalingFactorBI is optionally signaled by the gNB. The backoff value corresponding to backoff index received in RAR, is obtained by the UE from a pre-defined backoff table. scalingFactorBI is dedicatedly configured to the UE separately for RA initiated for beam failure recovery configuration and RA initiated for handover. If RA procedure is initiated for beam failure recovery and scalingFactorBI is not configured by the gNB for beam failure recovery, the UE sets SCALING_FACTOR_BI to 1. Otherwise, SCALING_FACTOR_BI is set to scalingFactorBI. If RA procedure is initiated for handover and scalingFactorBI is not configured by the gNB for handover, the UE sets SCALING_FACTOR_BI to 1. Otherwise, SCALING_FACTOR_BI is set to scalingFactorBI.

If a random access attempt is not successful, during the next random access attempt, the UE also ramps up the transmission power by PowerRampingStep or powerRampingStepHighPriority. PowerRampingStep or powerRampingStepHighPriority is signaled by the gNB. PowerRampingStep is configured in RACH configuration in SI and dedicated signaling and is cell specific. powerRampingStepHighPriority is dedicatedly configured to the UE separately for RA initiated for beam failure recovery configuration and RA initiated for handover. If RA procedure is initiated for beam failure recovery and powerRampingStepHighPriority is not configured by the gNB for beam failure recovery, the UE uses PowerRampingStep. If RA procedure is initiated for handover and powerRampingStepHighPriority is not configured by the gNB for handover, the UE uses PowerRampingStep.

2 step contention based random access (2 step CBRA): In the first step, the UE transmits random access preamble on PRACH and a payload (i.e., a MAC PDU) on PUSCH. The random access preamble and payload transmission is also referred to as MsgA. In the second step, after MsgA transmission, the UE monitors for a response from the network (i.e., a gNB) within a configured window. The response is also referred to as MsgB. If CCCH SDU was transmitted in MsgA payload, the UE performs contention resolution using the contention resolution information in MsgB. The contention resolution is successful if the contention resolution identity received in MsgB matches first 48 bits of CCCH SDU transmitted in MsgA. If C-RNTI was transmitted in MsgA payload, the contention resolution is successful if the UE receives PDCCH addressed to C-RNTI. If contention resolution is successful, random access procedure is considered successfully completed. Instead of contention resolution information corresponding to the transmitted MsgA, MsgB may include a fallback information corresponding to the random access preamble transmitted in MsgA. If the fallback information is received, the UE transmits Msg3 and performs contention resolution using Msg4 as in CBRA procedure. If contention resolution is successful, random access procedure is considered successfully completed. If contention resolution fails upon fallback (i.e., upon transmitting Msg3), the UE retransmits MsgA. If configured window in which the UE monitors network response after transmitting MsgA expires and the UE has not received MsgB including contention resolution information or fallback information as explained above, the UE retransmits MsgA. If the random access procedure is not successfully completed even after transmitting the MsgA configurable number of times, the UE fallbacks to 4 step RACH procedure, i.e., the UE only transmits the PRACH preamble.

Note that backoff and power ramping is applied for MsgA retransmission as in legacy random access procedure.

MsgA payload may include one or more of CCCH SDU, dedicated control channel (DCCH) SDU, dedicated traffic channel (DTCH) SDU, buffer status report (BSR) MAC CE, power headroom report (PHR) MAC CE, SSB information, C-RNTI MAC CE, or padding. MsgA may include the UE ID (e.g., a random ID, a S-TMSI, a C-RNTI, a resume ID, or the like) along with preamble in first step. The UE ID may be included in the MAC PDU of the MsgA. The UE ID, such as C-RNTI may be carried in MAC CE wherein MAC CE is included in MAC PDU. Other UE IDs (such a random ID, an S-TMSI, a C-RNTI, a resume ID, or the like) may be carried in CCCH SDU. The UE ID can be one of a random ID, an S-TMSI, a C-RNTI, a resume ID, an IMSI, an idle mode ID, an inactive mode ID, or the like. The UE ID can be different in different scenarios in which the UE performs the RA procedure. When the UE performs RA after power on (before it is attached to the network), then the UE ID is the random ID. When the UE perform RA in IDLE state after it is attached to network, the UE ID is S-TMSI. If the UE has an assigned C-RNTI (e.g., in a connected state), the UE ID is C-RNTI. In case the UE is in INACTIVE state, the UE ID is resume ID. In addition to the UE ID, some addition ctrl information can be sent in MsgA. The control information may be included in the MAC PDU of the MsgA. The control information may include one or more of connection request indication, connection resume request indication, SI request indication, buffer status indication, beam information (e.g., one or more DL TX beam ID(s) or SSB ID(s)), beam failure recovery indication/information, a data indicator, a cell/BS/transmission and reception point (TRP) switching indication, a connection re-establishment indication, a reconfiguration complete or handover complete message, or the like.

2 step contention free random access (2 step CFRA): In this case, the gNB assigns to the UE dedicated Random access preamble (s) and PUSCH resource(s) for MsgA transmission. RACH occasion(s) (RO(s)) to be used for preamble transmission may also be indicated. In the first step, the UE transmits random access preamble on PRACH and a payload on PUSCH using the contention free random access resources (i.e., a dedicated preamble/PUSCH resource/RO). In the second step, after MsgA transmission, the UE monitors for a response from the network (i.e., the gNB) within a configured window. If the UE receives PDCCH addressed to C-RNTI, random access procedure is considered successfully completed. If the UE receives fallback information corresponding to its transmitted preamble, random access procedure is considered successfully completed.

For certain events such has handover and beam failure recovery if dedicated preamble(s) and PUSCH resource(s) are assigned to the UE, during first step of random access, i.e., during random access resource selection for MsgA transmission, the UE determines whether to transmit dedicated preamble or non-dedicated preamble. Dedicated preambles is typically provided for a subset of SSBs/CSI RSs. If there is no SSB/CSI-RS having DL RSRP above a threshold amongst the SSBs/CSI-RSs for which contention free random access resources (i.e., dedicated preambles/ROs/PUSCH resources) are provided by the gNB, the UE select non dedicated preamble. Otherwise, the UE selects a dedicated preamble. Accordingly, during the RA procedure, one random access attempt can be 2 step CFRA while other random access attempt can be 2 step CBRA.

Upon initiation of RA procedure, the UE first selects the carrier (SUL or NUL). If the carrier to use for the RA procedure is explicitly signaled by the gNB, the UE select the signaled carrier for performing RA procedure. If the carrier to use for the RA procedure is not explicitly signaled by the gNB, and if the serving cell for the RA procedure is configured with supplementary uplink and if the RSRP of the downlink pathloss reference is less than rsrp-Threshold-SSB-SUL: The UE select the SUL carrier for performing RA procedure. Otherwise, the UE select the NUL carrier for performing RA procedure. Upon selecting the UL carrier, the UE determines the UL and DL BWP for RA procedure as specified in section 5.15 of TS 38.321. The UE then determines whether to perform 2 step or 4 step RACH for this RA procedure.

If this RA procedure is initiated by PDCCH order and if the ra-PreambleIndex explicitly provided by PDCCH is not 0b0000000, the UE selects 4 step RACH.
else, if 2 step contention free random access resources are signaled by the gNB for this random access procedure, the UE selects 2 step RACH.
else, if 4 step contention free random access resources are signaled by the gNB for this random access procedure, the UE selects 4 step RACH.
else, if the UL BWP selected for this random access procedure is configured with only 2 step RACH resources, the UE selects 2 step RACH.
else, if the UL BWP selected for this random access procedure is configured with only 4 step RACH resources, the UE selects 4 step RACH.
else, if the UL BWP selected for this random access procedure is configured with both 2 step and 4 step RACH resources,
if RSRP of the downlink pathloss reference is below a configured threshold, the UE selects 4 step RACH.
Otherwise, the UE selects 2 step RACH.

Note that backoff and power ramping is applied for MsgA retransmission as in legacy random access procedure.

In the 5th generation (also referred to as a new radio (NR), a wireless communication system UE can be in one of the following RRC state: RRC IDLE, RRC INACTIVE and RRC CONNECTED. The RRC states can further be characterized as follows:

In RRC_IDLE state, a UE specific discontinuous reception (DRX) may be configured by upper layers (i.e., a non-access stratum (NAS)). The UE, monitors short messages transmitted with paging RNTI (P-RNTI) over DCI, monitors a paging channel for a core network (CN) paging using 5G-S-TMSI, performs neighboring cell measurements and cell (re-)selection, acquires system information and can send SI request (if configured).

In RRC_INACTIVE state, a UE specific DRX may be configured by upper layers or by RRC layer. In this state, the UE stores the UE Inactive access stratum (AS) context. A RAN-based notification area is configured by RRC layer. The UE monitors short messages transmitted with P-RNTI over DCI, monitors a paging channel for CN paging using 5G-S-TMSI and RAN paging using full inactive RNTI (I-RNTI), performs neighboring cell measurements and cell (re-)selection, performs RAN-based notification area updates periodically and when moving outside the configured RAN-based notification area, acquires system information and can send SI request (if configured).

In the RRC_CONNECTED, the UE stores the AS context. The Unicast data is transmitted/received to/from the UE. At lower layers, the UE may be configured with a UE specific DRX. The UE monitors short messages transmitted with P-RNTI over DCI, if configured, monitors control channels associated with the shared data channel to determine if data is scheduled for it, provides channel quality and feedback information, performs neighboring cell measurements and measurement reporting, and acquires system information.

In the $5^{th}$ generation (also referred to as new radio (NR) wireless communication system, the UE may use DRX in RRC_IDLE and RRC_INACTIVE state in order to reduce power consumption. In the RRC_IDLE/RRC_INACTIVE state UE wakes up at regular intervals (i.e., every DRX cycle) for short periods to receive paging, to receive SI update notification and to receive emergency notifications. Paging message is transmitted using PDSCH. PDCCH is addressed to P-RNTI if there is a paging message in PDSCH. P-RNTI is common for all UEs. The UE identity (i.e., S-TMSI for RRC_IDLE UE or I-RNTI for RRC_INACTIVE UE) is included in paging message to indicate paging for a specific UE. The paging message may include multiple UE identities to page multiple UEs. The paging message is broadcasted (i.e., a PDCCH is masked with P-RNTI) over data channel (i.e., a PDSCH). SI update and emergency notifications are included in DCI and PDCCH carrying this DCI is addressed to P-RNTI. In the RRC idle/inactive mode, the UE monitors one paging occasion (PO) every DRX cycle. In the RRC idle/inactive mode, the UE monitors PO in initial DL BWP. In an RRC connected state, the UE monitors one or more POs to receive an SI update notification and to receive emergency notifications. The UE can monitor any PO in paging DRX cycle and monitors at least one PO in an SI modification period. In the RRC idle/inactive mode, the UE monitors PO in its active DL BWP.

A PO is a set of 'S' PDCCH monitoring occasions for paging, where 'S' is the number of transmitted SSBs (i.e., the synchronization signal and PBCH block (SSB) consists of primary synchronization signal (PSS), a secondary synchronization signal (SSS) and PBCH) in cell. The UE first determines the paging frame (PF) and then determines the PO with respect to the determined PF. One PF is a radio frame (10 ms).

The PF for a UE is the radio frame with system frame number 'SFN' which satisfies the equation (SFN+ PF_offset) mod T=(T div N)*(UE_ID mod N).
Index (i_s), indicating the index of the PO is determined by i_s=floor(UE_ID/N) mod Ns.
T is DRX cycle of the UE.
In RRC_INACTIVE state, T is determined by the shortest of the UE specific DRX value configured by RRC, the UE specific DRX value configured by NAS, and a default DRX value broadcast in system information.

In RRC_IDLE state, T is determined by the shortest of the UE specific DRX value configured by NAS, and a default DRX value broadcast in system information. If the UE specific DRX is not configured by upper layers (i.e., a NAS), the default value is applied.

N: number of total paging frames in T

Ns: number of paging occasions for a PF

PF_offset: offset used for PF determination

UE_ID: 5G-S-TMSI mod 1024

Parameters Ns, nAndPagingFrameOffset, and the length of default DRX Cycle are signaled in SIB1. The values of N and PF_offset are derived from the parameter nAndPagingFrameOffset as defined in TS 38.331. If the UE has no 5G-S-TMSI, for instance when the UE has not yet registered onto the network, the UE shall use as default identity UE_ID=0 in the PF and i_s formulas above.

The PDCCH monitoring occasions for paging are determined based on paging search space configuration (paging-SearchSpace) signaled by the gNB.

When SearchSpaceId=0 is configured for paging-SearchSpace, the PDCCH monitoring occasions for paging are same as for RMSI as defined in clause 13 in TS 38.213. When SearchSpaceId=0 is configured for pagingSearchSpace, Ns is either 1 or 2. For Ns=1, there is only one PO which starts from the first PDCCH monitoring occasion for paging in the PF. For Ns=2, PO is either in the first half frame (i_s=0) or the second half frame (i_s=1) of the PF.

When SearchSpaceId other than 0 is configured for pagingSearchSpace, the UE monitors the (i_s+1)-th PO. The PDCCH monitoring occasions for paging are determined based on paging search space configuration (paging-SearchSpace) signaled by the gNB. The PDCCH monitoring occasions for paging which are not overlapping with UL symbols (determined according to tdd-UL-DL-ConfigurationCommon) are sequentially numbered from zero starting from the 1st PDCCH monitoring occasion for paging in the PF. The gNB may signal parameter firstPDCCH-MonitoringOccasionOfPO for each PO corresponding to a PF. When firstPDCCH-MonitoringOccasionOfPO is signaled, the (i_s+1)-th PO is a set of 'S' consecutive PDCCH monitoring occasions for paging starting from the PDCCH monitoring occasion number indicated by firstPDCCH-MonitoringOccasionOfPO (i.e., the (i_s+1)-th value of the firstPDCCH-MonitoringOccasionOfPO parameter). Otherwise, the (i_s+1)-th PO is a set of 'S' consecutive PDCCH monitoring occasions for paging starting from the (i_s*S)-th PDCCH monitoring occasion for paging. 'S' is the number of actual transmitted SSBs determined according to parameter ssb-PositionsInBurst signaled in SystemInformationBlock1 received from the gNB. The parameter first-PDCCH-MonitoringOccasionOfPO is signaled in SIB1 for paging in initial DL BWP. For paging in a DL BWP other than the initial DL BWP, the parameter first-PDCCH-MonitoringOccasionOfPO is signaled in the corresponding BWP configuration.

The PDCCH addressed to P-RNTI carries information according to DCI format 1_0. The following information is transmitted by means of the DCI format 1_0 with cyclic redundancy check (CRC) scrambled by P-RNTI:

Short Messages Indicator—2 bits according to Table 1.

Short Messages—8 bits according to Table 2. If only the scheduling information for Paging is carried, this bit field is reserved.

Frequency domain resource assignment—$\lceil \log_2 (N_{RB}^{DL,BWP} (N_{RB}^{DL,BWP}+1)/2) \rceil$ bits. If only the short message is carried, this bit field is reserved.

$N_{RB}^{DL,BWP}$ is the size of CORESET 0

Time domain resource assignment—4 bits as defined in Subclause 5.1.2.1 of [6, TS38.214]. If only the short message is carried, this bit field is reserved.

virtual resource block (VRB)-to-PRB mapping—1 bit according to Table 7.3.1.1.2-33. If only the short message is carried, this bit field is reserved.

Modulation and coding scheme—5 bits as defined in Subclause 5.1.3 of [6, TS38.214], using Table 5.1.3.1-1. If only the short message is carried, this bit field is reserved.

transport block (TB) scaling—2 bits as defined in Subclause 5.1.3.2 of [6, TS38.214]. If only the short message is carried, this bit field is reserved.

Reserved bits—6 bits

TABLE 1

| Bit field | Short Message indicator |
| --- | --- |
| 00 | Reserved |
| 01 | Only scheduling information for Paging is present in the DCI |
| 10 | Only short message is present in the DCI |
| 11 | Both scheduling information for Paging and short message are present in the DCI |

Table 2 defines Short Message. Bit 1 is the most significant bit.

TABLE 2

| Bit | Short Message |
| --- | --- |
| 1 | systemInfoModification<br>If set to 1: indication of a broadcast control channel (BCCH) modification other than SIB6, SIB7 and SIB8. |
| 2 | etwsAndCmasIndication<br>If set to 1: indication of an earthquake and tsunami warning system (ETWS) primary notification and/or an ETWS secondary notification and/or a commercial mobile alert system (CMAS) notification. |
| 3-8 | Reserved |

Issue:

Ten least significant bits (LSBs) of 5G S-TMSI is used for PF/PO determination in RRC_IDLE and RRC_INACTIVE state. PF/PO for UEs in RRC_IDLE state and RRC_INACTIVE state will be same. As a result, if a RAN paging is sent for a UE in RRC INACTIVE state, several UE(s) in RRC IDLE state sharing the same PF/PO will decode scheduled TB carrying paging message upon receiving PDCCH addressed to P-RNTI where short message indicator in DCI indicates that DCI includes scheduling information for paging. This increases the power consumption of UE's in RRC_IDLE state as they have to unnecessarily received and decode the DL TB carrying paging message.

Embodiment 1

Method of Minimizing Power Consumption for UE's in RRC IDLE Due to RAN Paging (Minimizing UE's Power Consumption)

Embodiment 1-1

In one method of this disclosure, the DCI (transmitted by the gNB) indicates whether the paging message includes only RAN paging for one or more UEs (i.e., each paging record in paging message includes I-RNTI, there is no paging record in paging message which includes NG-5G-S-TMSI). If the UE is in an RRC_IDLE state and the received DCI indicates that the paging message includes only a RAN paging for one or more UEs, the UE does not receive/decode PDSCH for paging message. In one method of this disclosure, it is proposed to include a 1 bit indicator (i.e., a RAN paging indicator) in DCI whose CRC is scrambled by P-RNTI (or any other RNTI which is pre-defined or signaled by the gNB). The DCI is transmitted on PDCCH. This DCI may be transmitted in PDCCH monitoring occasion(s) of PO or it may be transmitted in PDCCH monitoring occasion(s) before the PO. The name of indicator can also be CN paging absence indicator.

In an embodiment of the disclosure, when the gNB transmits DCI whose CRC is scrambled by P-RNTI for scheduling paging message where paging message includes only RAN paging for one or more UE(s) (i.e., each paging record in paging message includes I-RNTI, there is no paging record in paging message which includes NG-5G-S-TMSI), the RAN paging indicator/CN paging absence indicator in DCI is set to 1. The paging message for only RAN paging includes only a UE ID(s) for RAN paging i.e., it includes only one or more I-RNTIs. In an embodiment of the disclosure, when the gNB transmits DCI whose CRC is scrambled by P-RNTI for scheduling paging message where paging message includes CN paging for one or more UE(s) (paging message may include RAN paging for zero, one or more UEs in addition to CN paging), an RAN paging indicator/CN paging absence indicator is included in DCI and is set to 0 or RAN paging indicator/CN paging absence indicator is not included in DCI. The paging message for CN paging includes a UE ID(s) for CN paging, i.e., it includes one or more 5G-S-TMSIs. In an embodiment of the disclosure, when the gNB transmits DCI whose CRC is scrambled by P-RNTI for short message only, a RAN paging indicator/CN paging absence indicator is included in DCI and is set to 0 or RAN paging indicator/CN paging absence indicator is not included in DCI.

In an embodiment of the disclosure, when the gNB transmits DCI whose CRC is scrambled by P-RNTI and DCI includes scheduling information for paging (i.e., scheduling information for DL TB carrying paging message) where paging message includes only an RAN paging for one or more UE(s), an RAN paging indicator/CN paging absence indicator in DCI is set to 1. The paging message for only RAN paging includes only UE ID(s) for RAN paging i.e., it includes only one or more I-RNTIs. In an embodiment of the disclosure, when the gNB transmits DCI whose CRC is scrambled by P-RNTI and DCI includes scheduling information for paging (i.e., scheduling information for DL TB carrying paging message) where paging message includes CN paging for one or more UE(s) (paging message may include RAN paging for zero, one or more UEs in addition to CN paging), RAN paging indicator/CN paging absence indicator in DCI is included and is set to 0 or RAN paging indicator/CN paging absence indicator is not included in DCI. Paging message for CN paging includes UE ID(s) for CN paging, i.e., it includes one or more 5G-S-TMSIs.

In an embodiment of the disclosure, when the gNB transmits DCI whose CRC is scrambled by P-RNTI and a short message indicator in DCI indicates that scheduling information for paging (i.e., scheduling information for DL TB carrying paging message) is included in DCI where paging message includes only RAN paging for one or more UE(s), an RAN paging indicator/CN paging absence indicator in DCI is set to 1. The paging message for only an RAN paging includes only a UE ID(s) for an RAN paging, i.e., it includes only one or more I-RNTIs. In an embodiment of the disclosure, when the gNB transmits DCI whose CRC is scrambled by P-RNTI and a short message indicator in DCI indicates that scheduling information for paging (i.e., scheduling information for DL TB carrying paging message) is included in DCI where a paging message includes CN paging for one or more UE(s) (the paging message may include an RAN paging for zero, one or more UEs in addition to CN paging), the RAN paging indicator/CN paging absence indicator in DCI is included and is set to 0 or the RAN paging indicator/CN paging absence indicator is not included in DCI. The paging message for CN paging includes a UE ID(s) for CN paging i.e., it includes one or more 5G-S-TMSIs.

Size of I-RNTI is 40 bits and size of 5G-S-TMSI is 48 bits. In the disclosure, the UE ID for CN paging is 5G-S-TMSI and the UE ID for RAN paging is I-RNTI. However, any other UE IDs for RAN paging and CN paging can also be used in the methods proposed in this disclosure.

One example of DCI CRC scrambled by P-RNTI including RAN paging indicator is as follows:

Short Messages Indicator—2 bits according to Table 1.

Short Messages—8 bits according to Table 2. If only the scheduling information for Paging is carried, this bit field is reserved.

Frequency domain resource assignment—$\lceil \log_2 (N_{RB}^{DL,BWP}(N_{RB}^{DL,BWP}+1)/2) \rceil$ bits. If only the short message is carried, this bit field is reserved.

$N_{RB}^{DL,BWP}$ is the size of CORESET 0

Time domain resource assignment—4 bits. If only the short message is carried, this bit field is reserved.

VRB-to-PRB mapping—1 bit. If only the short message is carried, this bit field is reserved.

Modulation and coding scheme—5 bits. If only the short message is carried, this bit field is reserved.

TB scaling—2 bits. If only the short message is carried, this bit field is reserved.

RAN Paging Indicator/CN paging absence indicator—1 bit

Reserved bits—5 bits

FIGS. 1A and 1B illustrate a flowchart of transmitting a short message or a paging message according to various embodiments of the disclosure. FIGS. 1A and 1B illustrate a gNB operation regarding the embodiment.

Referring to FIGS. 1A and 1B, the gNB has at least one of short message or paging message for transmission at operation 105.

If transmission of only short message is needed at operation 110:

The gNB sets short message indicator field to indicate that only short message is present in the DCI at operation 115

The gNB does not include scheduling information for paging in DCI

The gNB includes short message in DCI at operation 120

The gNB includes RAN paging indicator/CN paging absence indicator in DCI and set it to 0. Alternately, the gNB does not include RAN paging indicator/CN paging absence indicator in DCI at operation 125

The gNB scrambles the CRC of DCI by P-RNTI at operation 130

The gNB transmits the DCI together with CRC over PDCCH monitoring occasion(s) in paging occasion at operation 130 or over PDCCH monitoring occasion(s) before the paging occasion.

If transmission of only paging message is needed at operation 135:

The gNB sets short message indicator field to indicate that only scheduling information for paging is present in the DCI at operation 140

The gNB includes scheduling information for paging in DCI at operation 145

The gNB does not include short message in DCI if the paging message scheduled by this DCI includes only one or more UE IDs for RAN paging (i.e., it includes only one or more I-RNTIs) at operation 150:

The gNB includes RAN paging indicator/CN paging absence indicator in DCI and set it to 1 at operation 155.

Else:

The gNB includes RAN paging indicator/CN paging absence indicator in DCI and set it to 0. Alternately, the gNB does not include RAN paging indicator/CN paging absence indicator in DCI at operation 185

The gNB scrambles the CRC of DCI by P-RNTI at operation 160

The gNB transmits the DCI together with CRC over PDCCH monitoring occasion(s) in paging occasion at operation 160 or over PDCCH monitoring occasion(s) before the paging occasion The gNB transmits the paging message over PDSCH at operation 165

If transmission of both short message and paging message is needed (135):

The gNB sets short message indicator field to indicate that both scheduling information for paging and short message is present in the DCI at operation 170

The gNB includes scheduling information for paging in DCI at operation 175

The gNB includes short message in DCI at operation 180 if the paging message scheduled by this DCI includes only one or more UE IDs for RAN paging (i.e., it includes only one or more I-RNTIs) at operation 150:

The gNB includes RAN paging indicator/CN paging absence indicator in DCI and set it to 1 at operation 155.

Else:

The gNB includes RAN paging indicator/CN paging absence indicator in DCI and set it to 0. Alternately, gNB does not include RAN paging indicator/CN paging absence indicator in DCI at operation 185

The gNB scrambles the CRC of DCI by P-RNTI at operation 160

The gNB transmits the DCI together with CRC over PDCCH monitoring occasion(s) in paging occasion at operation 160 or over PDCCH monitoring occasion(s) before the paging occasion The gNB transmits the paging message over PDSCH at operation 165

Figure 2:
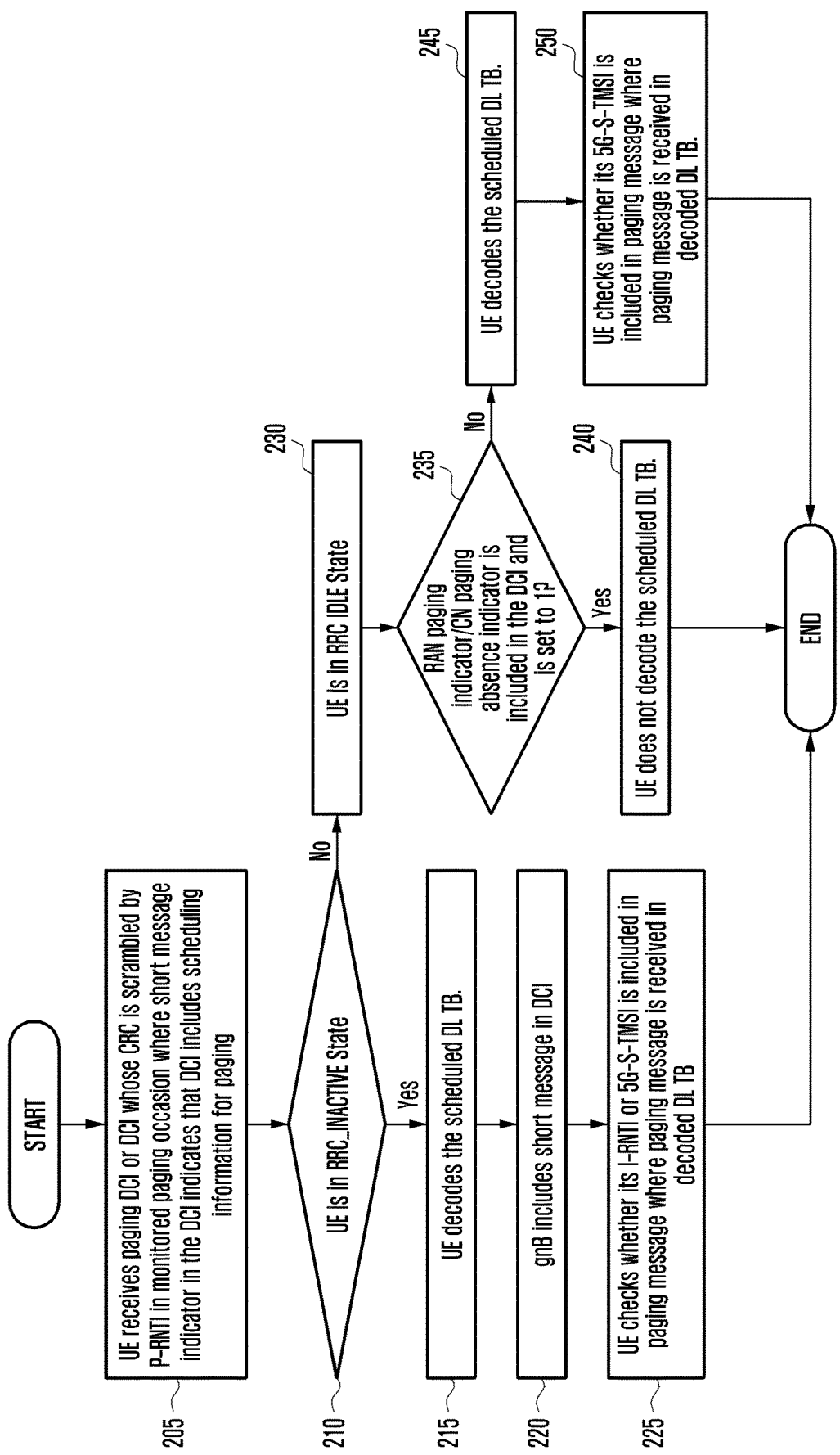
FIG. 2 illustrates a flowchart of receiving a paging message according to an embodiment of the disclosure.

FIG. 2 illustrates a flowchart of receiving a paging message according to an embodiment of the disclosure. FIG. 2 illustrates a UE operation regarding the embodiment.

Referring to FIG. 2, the UE receives paging DCI or DCI whose CRC is scrambled by P-RNTI in monitored paging occasion (i.e., in PDCCH monitoring occasion(s) in paging occasion or before the paging occasion) where short message indicator in the DCI indicates that DCI includes scheduling information for paging at operation 205.

If the UE is in RRC_INACTIVE state at operation 210:

The UE decodes the scheduled DL TB. The UE checks whether its I-RNTI or 5G-S-TMSI is included in paging message where paging message is received in decoded DL TB at operations 215, 220, and 225).

Else, if the UE is in RRC_IDLE state at operation 230:

If an RAN paging indicator/CN paging absence indicator is included in the DCI and is set to 1 (or the RAN paging indicator in DCI is set to 1) at operation 235

The UE does not decode the scheduled DL TB at operation 240.

else at operation 235

The UE decodes the scheduled DL TB at operation 245. The UE checks whether its 5G-S-TMSI is included in paging message where paging message is received in decoded DL TB at operation 250.

Embodiment 1-1A

In one method of this disclosure, it is proposed to include a 1 bit indicator (RAN paging indicator/CN paging absence indicator) in short message. Short message is included in DCI whose CRC is scrambled by P-RNTI (or any other RNTI which is pre-defined or signaled by the gNB). DCI is transmitted in PDCCH monitoring occasion(s) of PO or in PDCCH monitoring occasion(s) before the PO.

In an embodiment of the disclosure, when the gNB transmits DCI whose CRC is scrambled by P-RNTI for scheduling paging message where paging message includes only RAN paging for one or more UE(s), short message is included in DCI and RAN paging indicator/CN paging absence indicator in short message is set to 1. The paging message for only RAN paging includes only a UE ID(s) for an RAN paging, i.e., it includes only one or more I-RNTIs. In an embodiment of the disclosure, when the gNB transmits DCI whose CRC is scrambled by P-RNTI for scheduling paging message where the paging message includes the CN paging for one or more UE(s) (i.e., a paging message may include an RAN paging for zero, one or more UEs in addition to C N paging) and if short message is also included in DCI (e.g., for an SI update notification, an emergency notification, or the like), the RAN paging indicator/CN paging absence indicator is set to 0 in short message. The paging message for CN paging includes UE ID(s) for CN paging i.e., it includes one or more 5G-S-TMSIs. In an embodiment of the disclosure, when the gNB transmits DCI whose CRC is scrambled by P-RNTI for short message only (i.e., there is no paging message), the RAN paging indicator/CN paging absence indicator is set to 0 in short message.

In an embodiment of the disclosure, when the gNB transmits DCI whose CRC is scrambled by P-RNTI and DCI includes scheduling information for paging (i.e., scheduling information for DL TB carrying paging message) where paging message includes only RAN paging for one or more UE(s), short message is included in DCI and an RAN paging indicator/CN paging absence indicator in short message is set to 1 The paging message for only RAN paging includes only a UE ID(s) for an RAN paging, i.e., it includes only one or more I-RNTIs. In an embodiment of the disclosure, when the gNB transmits DCI whose CRC is scrambled by P-RNTI and DCI includes scheduling information for paging (i.e., scheduling information for DL TB carrying the paging message) where the paging message includes CN paging for one or more UE(s) (paging message may include an RAN paging for zero, one or more UEs in addition to the CN paging) and if a short message is also included in DCI (e.g., for an SI update notification, an emergency notification, or the like), an RAN paging indicator/CN paging absence indicator is set to 0 in a short message. The paging message for a CN paging includes a UE ID(s) for a CN paging, i.e., it includes one or more 5G-S-TMSIs.

In an embodiment of the disclosure, when the gNB transmits DCI whose CRC is scrambled by P-RNTI and a short message indicator in DCI indicates that scheduling information for paging (i.e., scheduling information for DL TB carrying paging message) is included in DCI where the paging message includes only an RAN paging for one or more UE(s), the short message is also included in DCI and RAN paging indicator/CN paging absence indicator in a short message is set to 1. The paging message for only an RAN paging includes only a UE ID(s) for an RAN paging, i.e., it includes only one or more I-RNTIs. In an embodiment of the disclosure, when the gNB transmits DCI whose a CRC is scrambled by P-RNTI and a short message indicator in DCI indicates that scheduling information for paging (i.e., scheduling information for a DL TB carrying paging message) is included in DCI where the paging message includes a CN paging for one or more UE(s) (i.e., the paging message may include an RAN paging for zero, one or more UEs in addition to a CN paging) and if a short message is also included in DCI (e.g., for an SI update notification, an emergency notification, or the like), an RAN paging indicator/CN paging absence indicator is set to 0 in a short message. The paging message for a CN paging includes a UE ID(s) for the CN paging, i.e., it includes one or more 5G-S-TMSIs.

Size of I-RNTI is 40 bits and size of 5G-S-TMSI is 48 bits. In the disclosure, a UE ID for CN paging is 5G-S-TMSI and a UE ID for RAN paging is I-RNTI. However, any other UE IDs for RAN paging and CN paging can also be used in the methods proposed in this disclosure.

One example of short message including RAN paging indicator is as following Table 3:

TABLE 3

| Bit | Short Message |
|---|---|
| 1 | systemInfoModification<br>If set to 1: indication of a BCCH modification other than SIB6, SIB7 and SIB8. |
| 2 | etwsAndCmasIndication<br>If set to 1: indication of an ETWS primary notification and/or an ETWS secondary notification and/or a CMAS notification. |
| 3 | RAN Paging Indicator/CN paging absence indicator<br>If set to 1: indication that scheduled paging message includes only RAN paging |
| 4-8 | Reserved |

Hereinafter, the gNB operation according to the embodiment 1-1A is described.

The gNB has at least one of SI update/Emergency Notification or paging message for transmission.

If transmission of SI update/Emergency Notification only is needed:
The gNB sets short message indicator field to indicate that only short message is present in the DCI
The gNB does not include scheduling information for paging in DCI
The gNB includes short message in DCI.
RAN paging indicator/CN paging absence indicator is set to 0 in short message.
If indication of a BCCH modification other than SIB6, SIB7 and SIB8 is needed, systemInfoModification bit is set to 1
If indication of an ETWS primary notification and/or an ETWS secondary notification and/or a CMAS notification is needed etwsAndCmasIndication bit is set to 1
The gNB scrambles the CRC of DCI by P-RNTI
The gNB transmits the DCI together with CRC over PDCCH in paging occasion
If transmission of only paging message is needed:
The gNB includes scheduling information for paging in DCI
if the paging message scheduled by this DCI includes only one or more UE IDs for RAN paging (i.e., it includes only one or more I-RNTIs):
The gNB sets short message indicator field to indicate that both short message and scheduling information for paging is present in the DCI
The gNB includes short message in DCI
The gNB sets RAN paging indicator/CN paging absence indicator in short message to 1.
Else:
The gNB sets short message indicator field to indicate that only scheduling information for paging is present in the DCI
The gNB does not include short message in DCI
The gNB scrambles the CRC of DCI by P-RNTI
The gNB transmits the DCI together with CRC over PDCCH in paging occasion
The gNB transmits the paging message over PDSCH
If transmission of both SI update/Emergency Notification and paging message is needed:
The gNB sets short message indicator field to indicate that both scheduling information for paging and short message is present in the DCI
The gNB includes scheduling information for paging in DCI
The gNB includes short message in DCI
if the paging message scheduled by this DCI includes only one or more UE IDs for RAN paging (i.e., it includes only one or more I-RNTIs):
The gNB sets RAN paging indicator/CN paging absence indicator in short message to 1.
Else:
The gNB sets RAN paging indicator/CN paging absence indicator in short message to 0.
The gNB scrambles the CRC of DCI by P-RNTI
The gNB transmits the DCI together with CRC over PDCCH monitoring occasion(s) in paging occasion or over PDCCH monitoring occasion(s) before the paging occasion(s).
The gNB transmits the paging message over PDSCH
Hereinafter, the UE operation according to the embodiment 1-1A is described.

The UE receives paging DCI or DCI whose CRC is scrambled by P-RNTI in monitored paging occasion (i.e., in PDCCH monitoring occasion(s) in paging occasion or before the paging occasion) where short message indicator in the DCI indicates that DCI includes scheduling information for paging.

If the UE is in RRC_INACTIVE state:
The UE decodes the scheduled DL TB. The UE checks whether its I-RNTI or 5G-S-TMSI is included in paging message where paging message is received in decoded DL TB.
Else, if the UE is in RRC_IDLE state:
If short message is included in DCI and RAN paging indicator/CN paging absence indicator in short message is set to 1
The UE does not decode the scheduled DL TB.
Else (i.e., a short message is not included in DCI or RAN paging indicator/CN paging absence indicator in short message is set to 0)
The UE decodes the scheduled DL TB. The UE checks whether its 5G-S-TMSI is included in paging message where paging message is received in decoded DL TB.

Embodiment 1-2

In one method of this disclosure, DCI (transmitted by the gNB) indicates whether the paging message includes CN paging for one or more UEs (i.e., there is at least one paging record in paging message which includes NG-5G-S-TMSI, the paging message may include an RAN paging for zero, one or more UEs in addition to a CN paging). If the UE is in RRC_IDLE state and received DCI indicates that paging message includes a CN paging for one or more UEs, the UE receives/decodes a PDSCH for a paging message. In one method of this disclosure, it is proposed to include a 1 bit indicator (e.g., a CN paging indicator) in DCI whose CRC is scrambled by P-RNTI or any other RNTI which is pre-defined or signaled by the gNB. The DCI is transmitted on a PDCCH. This DCI may be transmitted in PDCCH monitoring occasion(s) of a PO or it may be transmitted in PDCCH monitoring occasion(s) before the PO. The PDCCH monitoring occasions of the PO are determined as explained in background.

In an embodiment of the disclosure, when the gNB transmits DCI whose CRC is scrambled by P-RNTI for scheduling a paging message where the paging message includes a CN paging for one or more UE(s) (i.e., the paging message may include an RAN paging for zero, one or more UEs in addition to an CN paging), an CN paging indicator in DCI is set to 1. The paging message for the CN paging includes a UE ID(s) for the CN paging, i.e., it includes one or more 5G-S-TMSIs. In an embodiment of the disclosure, when the gNB transmits DCI whose CRC is scrambled by P-RNTI for scheduling the paging message where the paging message does not include the CN paging for one or more UE(s), the CN paging indicator is included in DCI and is set to 0 or the CN paging indicator is not included in DCI. The paging message for the CN paging includes a UE ID(s) for the CN paging, i.e., it includes one or more 5G-S-TMSIs. In an embodiment of the disclosure, when the gNB transmits DCI whose CRC is scrambled by the P-RNTI for a short message only, the CN paging indicator is included in DCI and is set to 0 or the CN paging indicator is not included in DCI.

In an embodiment of the disclosure, when the gNB transmits DCI whose CRC is scrambled by P-RNTI and DCI includes scheduling information for paging (i.e., scheduling information for a DL TB carrying paging message) where the paging message includes the CN paging for one or more UE(s), (i.e., the paging message may include an RAN paging for zero, one or more UEs in addition to the CN paging), the CN paging indicator in DCI is set to 1. The paging message for the CN paging includes a UE ID(s) for the CN paging i.e., it includes one or more 5G-S-TMSIs. In an embodiment of the disclosure, when the gNB transmits DCI whose CRC is scrambled by P-RNTI and DCI includes scheduling information for paging (i.e., scheduling information for DL TB carrying the paging message) where the paging message does not include the CN paging for one or more UE(s), the CN paging indicator in DCI is included and is set to 0 or the CN paging indicator is not included in DCI. The paging message for the CN paging includes a UE ID(s) for the CN paging, i.e., it includes one or more 5G-S-TMSIs.

In an embodiment of the disclosure, when the gNB transmits DCI whose CRC is scrambled by P-RNTI and short message indicator in DCI indicates that scheduling information for paging (i.e., scheduling information for DL TB carrying paging message) is included in DCI where the paging message includes the CN paging for one or more UE(s) (i.e., the paging message may include an RAN paging for zero, one or more UEs in addition to the CN paging), the CN paging indicator in DCI is set to 1. The paging message for the CN paging includes a UE ID(s) for the CN paging i.e., it includes one or more 5G-S-TMSIs. In an embodiment of the disclosure, when the gNB transmits DCI whose CRC is scrambled by P-RNTI and the short message indicator in DCI indicates that the scheduling information for paging (i.e., the scheduling information for DL TB carrying the paging message) is included in DCI where the paging message does not include the CN paging for one or more UE(s), the CN paging indicator in DCI is included and is set to 0 or the CN paging indicator is not included in DCI. The paging message for the CN paging includes a UE ID(s) for the CN paging, i.e., it includes one or more 5G-S-TMSIs.

In the disclosure, the UE ID for the CN paging is 5G-S-TMSI and the UE ID for an RAN paging is I-RNTI. However, any other UE IDs for the RAN paging and the CN paging can also be used in the methods proposed in this disclosure.

Figure 3A:
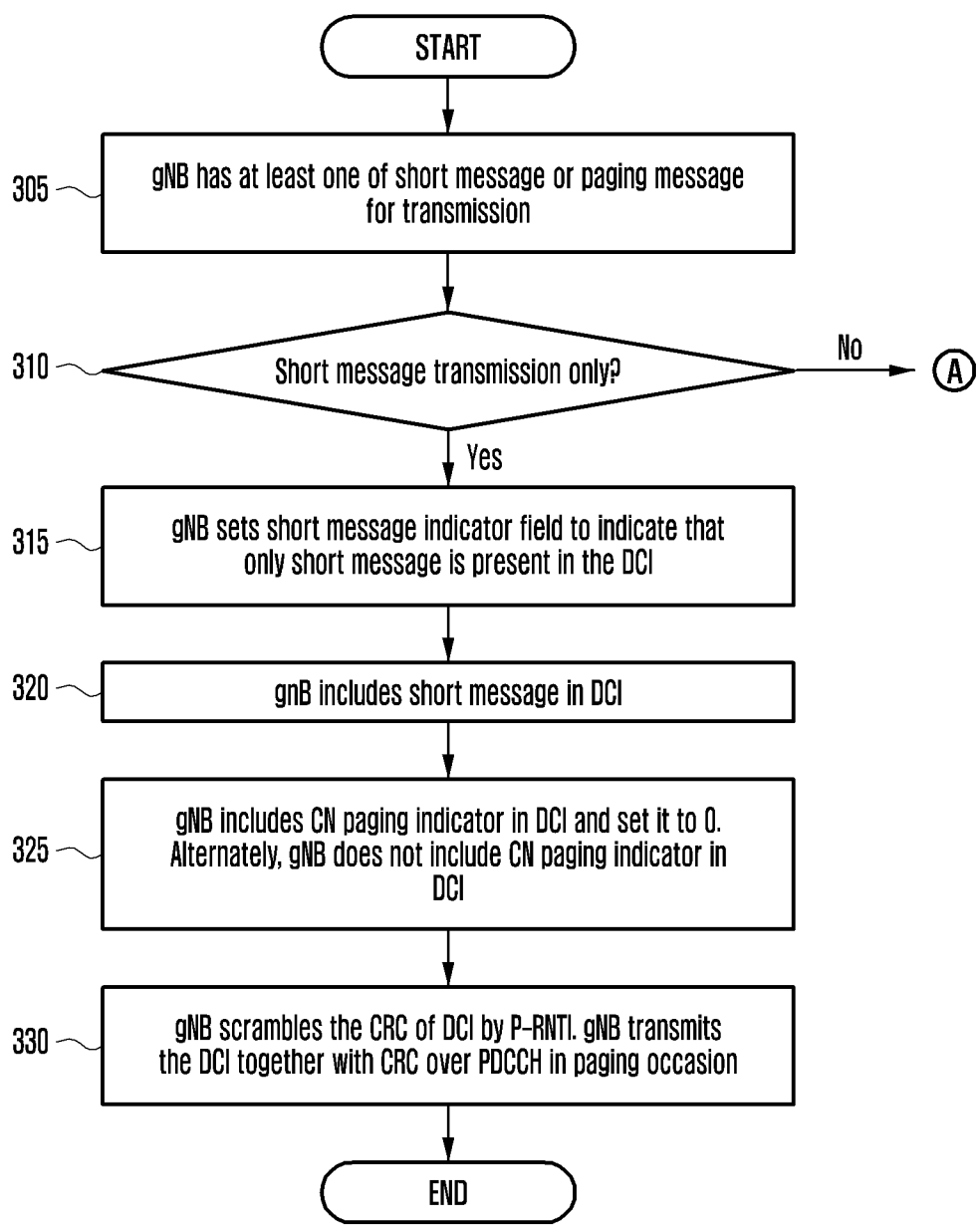
FIGS. 3A and 3B illustrate a flowchart of transmitting a short message or a paging message according to various embodiments of the disclosure.
Figure 3B:
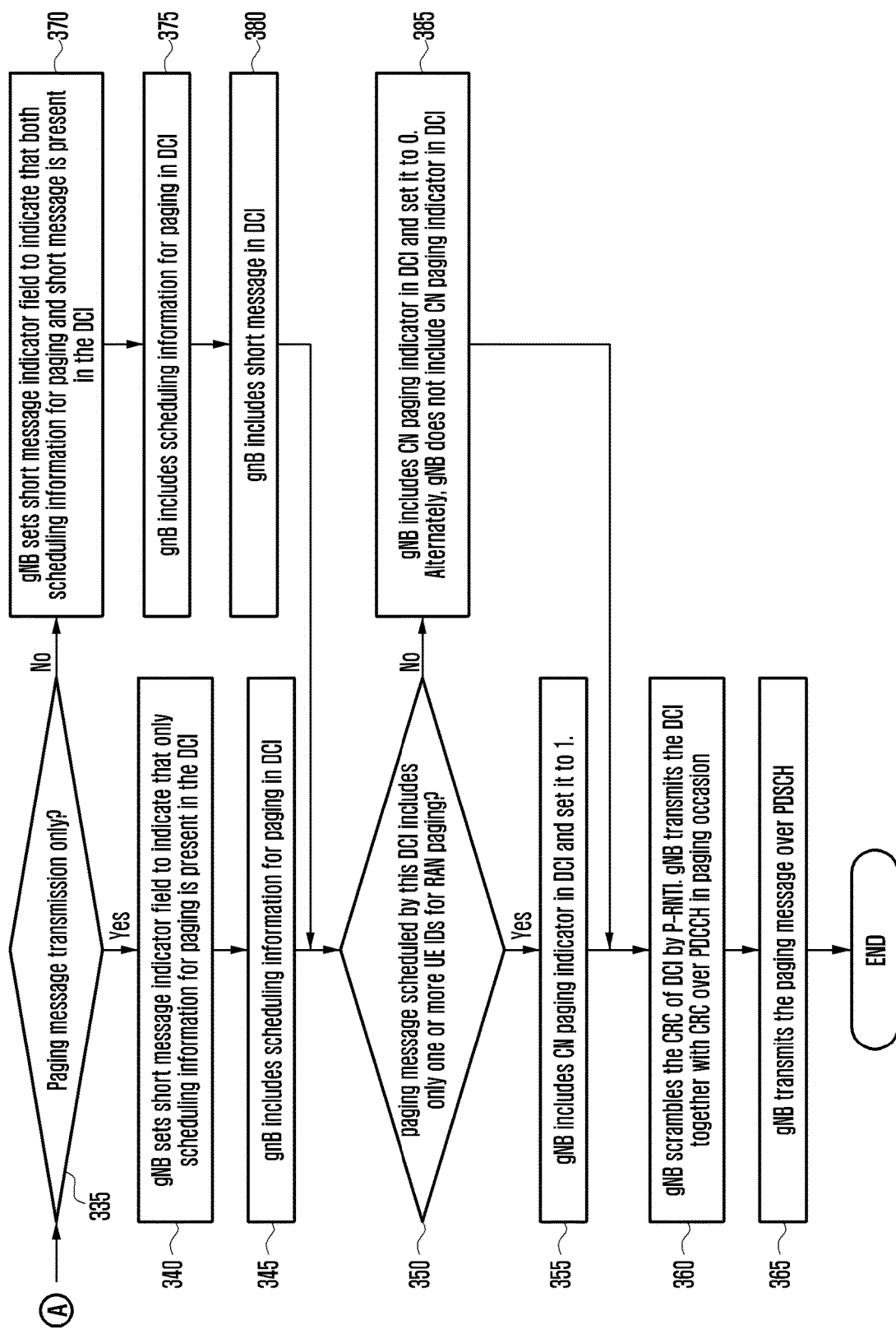

One example of DCI CRC scrambled by P-RNTI including RAN paging indicator is as follows:
Short Messages Indicator—2 bits according to Table 1.
Short Messages—8 bits according to Table 2. If only the scheduling information for Paging is carried, this bit field is reserved.
Frequency domain resource assignment—$\lceil \log_2 (N_{RB}^{DL,BWP} (N_{RB}^{DL,BWP}+1)/2) \rceil$ bits. If only the short message is carried, this bit field is reserved.
$N_{RB}^{DL,BWP}$ is the size of CORESET 0
Time domain resource assignment—4 bits. If only the short message is carried, this bit field is reserved.
VRB-to-PRB mapping—1 bit. If only the short message is carried, this bit field is reserved.
Modulation and coding scheme—5 bits. If only the short message is carried, this bit field is reserved.
TB scaling—2 bits. If only the short message is carried, this bit field is reserved.
CN Paging Indicator—1 bit
Reserved bits—5 bits
FIGS. 3A and 3B illustrate a flowchart of transmitting a short message or a paging message according to various embodiments of the disclosure. FIGS. 3A and 3B illustrate the gNB operation regarding the embodiment.

Referring to FIGS. 3A and 3B, the gNB has at least one of short message or paging message for transmission at operation 305.

If transmission of only short message is needed at operation 310

The gNB sets short message indicator field to indicate that only short message is present in the DCI at operation 315
The gNB does not include scheduling information for paging in DCI
The gNB includes short message in DCI at operation 320
The gNB includes CN paging indicator in DCI and set it to 0. Alternately, the gNB does not include CN paging indicator in DCI at operation 325
The gNB scrambles the CRC of DCI by P-RNTI at operation 330
The gNB transmits the DCI together with CRC over PDCCH monitoring occasion(s) of paging occasion at operation 330 or over PDCCH monitoring occasion(s) before paging occasion.
If transmission of only paging message is needed at operation 335:
  The gNB sets short message indicator field to indicate that only scheduling information for paging is present in the DCI at operation 340
  The gNB includes scheduling information for paging in DCI at operation 345
  The gNB does not include short message in DCI
  if the paging message scheduled by this DCI includes one or more UE IDs for CN paging (i.e., it includes one or more 5G-S-TMSIs) at operation 350:
    The gNB includes CN paging indicator in DCI and set it to 1 at operation 355.
  Else at operation 350:
    The gNB includes CN paging indicator in DCI and set it to 0. Alternately, gNB does not include CN paging indicator in DCI at operation 385
  The gNB scrambles the CRC of DCI by P-RNTI at operation 360
  The gNB transmits the DCI together with CRC over PDCCH monitoring occasion(s) of paging occasion at operation 360 or over PDCCH monitoring occasion(s) before paging occasion
  The gNB transmits the paging message over PDSCH at operation 365
If transmission of both short message and paging message is needed at operation 335:
  The gNB sets short message indicator field to indicate that both scheduling information for paging and short message is present in the DCI at operation 370
  The gNB includes scheduling information for paging in DCI at operation 375
  The gNB includes short message in DCI at operation 380
  if the paging message scheduled by this DCI includes one or more UE IDs for CN paging (i.e., it includes only one or more 5G-S-TMSIs) at operation 350:
    The gNB includes CN paging indicator in DCI and set it to 1 at operation 355.
  Else at operation 350:
    The gNB includes CN paging indicator in DCI and set it to 0. Alternately, gNB does not include CN paging indicator in DCI at operation 385
  The gNB scrambles the CRC of DCI by P-RNTI at operation 360
  The gNB transmits the DCI together with CRC over PDCCH monitoring occasion(s) of paging occasion at operation 360 or over PDCCH monitoring occasion(s) before paging occasion.
  The gNB transmits the paging message over PDSCH at operation 365

Figure 4:
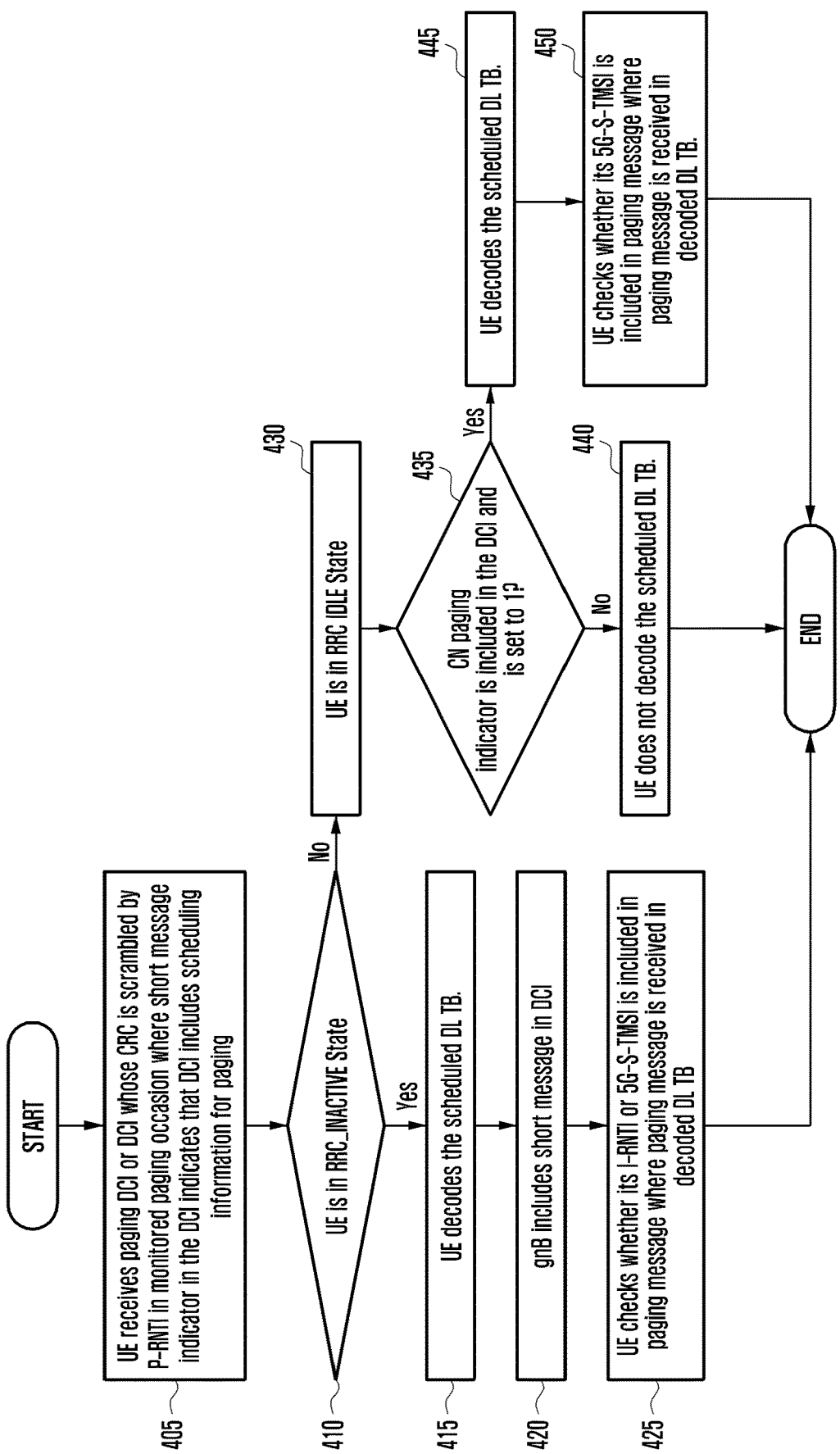
FIG. 4 illustrates a flowchart of receiving a paging message according to an embodiment of the disclosure.

FIG. 4 illustrates a flowchart of receiving a paging message according to an embodiment of the disclosure. FIG. 4 illustrates a UE operation regarding the embodiment.

Referring to FIG. 4, the UE receives paging DCI or DCI whose CRC is scrambled by P-RNTI in monitored paging occasion (i.e., in PDCCH monitoring occasion(s) of paging occasion or over PDCCH monitoring occasion(s) before paging occasion) where a short message indicator in the DCI indicates that the DCI includes scheduling information for paging at operation 405.
If the UE is in RRC_INACTIVE state at operation 410:
  The UE decodes the scheduled DL TB. The UE checks whether its I-RNTI or 5G-S-TMSI is included in paging message where paging message is received in decoded DL TB at operations 415, 420, and 425.
Else, if the UE is in RRC_IDLE state at operation 430:
  If the CN paging indicator is supported (This can be indicated by network in paging configuration via system information or RRC signaling, in an embodiment of the disclosure, the UE may skip checking of the CN paging indicator support):
    If the CN paging indicator is included in the DCI and is set to 1 (or CN paging indicator in DCI is set to 1) at operation 435
      The UE decodes the scheduled DL TB at operation 445. The UE checks whether its 5G-S-TMSI is included in paging message where paging message is received in decoded DL TB at operation 450.
    else at operation 435
      The UE does not decode the scheduled DL TB at operation 440.
  Else
    The UE decodes the scheduled DL TB. The UE checks whether its 5G-S-TMSI is included in the paging message where the paging message is received in decoded DL TB.

Embodiment 1-2A

In one method of this disclosure, it is proposed to include a 1 bit indicator (the CN paging indicator) in a short message. The short message is included in DCI whose CRC is scrambled by P-RNTI or any other RNTI which is pre-defined or signaled by the gNB. The DCI is transmitted on PDCCH. This DCI may be transmitted in PDCCH monitoring occasion(s) of PO or it may be transmitted in PDCCH monitoring occasion(s) before the PO. If the UE is in an RRC_IDLE state and received short message indicates that the paging message includes the CN paging for one or more UEs, the UE receives/decodes PDSCH for the paging message.

In an embodiment of the disclosure, when the gNB transmits DCI whose CRC is scrambled by P-RNTI for scheduling the paging message where the paging message includes the CN paging for one or more UE(s) (i.e., the paging message may include RAN paging for zero, one or more UEs in addition to the CN paging), the short message is included in DCI and the CN paging indicator in the short message is set to 1. The paging message for the CN paging includes UE ID(s) for the CN paging, i.e., it includes one or more 5G-S-TMSIs. In an embodiment of the disclosure, when the gNB transmits DCI whose CRC is scrambled by P-RNTI for scheduling the paging message where the paging message does not include the CN paging for one or more UE(s), and if a short message is also included in DCI (e.g., for an SI update notification, emergency notification, or the like), the CN paging indicator in the short message is set to 0. The paging message for the CN paging includes the UE ID(s) for the CN paging, i.e., it includes one or more 5G-S-TMSIs. In an embodiment of the disclosure, when the gNB transmits DCI whose CRC is scrambled by P-RNTI for short message only, CN paging indicator in short message is set to 0.

In an embodiment of the disclosure, when the gNB transmits DCI whose CRC is scrambled by P-RNTI and DCI includes scheduling information for paging (i.e., scheduling information for DL TB carrying paging message) where the paging message includes the CN paging for one or more UE(s), (i.e., the paging message may include the RAN paging for zero, one or more UEs in addition to the CN paging), the short message is included in DCI and the CN paging indicator in the short message is set to 1. The paging message for the CN paging includes a UE ID(s) for the CN paging, i.e., it includes one or more 5G-S-TMSIs. In an embodiment of the disclosure, when the gNB transmits DCI whose CRC is scrambled by P-RNTI and DCI includes scheduling information for paging (i.e., scheduling information for DL TB carrying paging message) where the paging message does not include the CN paging for one or more UE(s) and if the short message is also included in DCI (e.g., for the SI update notification, the emergency notification, or the like), the CN paging indicator in short message is set to 0. The paging message for the CN paging includes a UE ID(s) for the CN paging i.e., it includes one or more 5G-S-TMSIs.

In an embodiment of the disclosure, when the gNB transmits DCI whose CRC is scrambled by P-RNTI and the short message indicator in DCI indicates that scheduling information for paging (i.e., scheduling information for DL TB carrying paging message) is included in DCI where the paging message includes the CN paging for one or more UE(s) (i.e., the paging message may include an RAN paging for zero, one or more UEs in addition to CN paging), the short message is included in DCI and the CN paging indicator in short message is set to 1. The paging message for the CN paging includes a UE ID(s) for the CN paging, i.e., it includes one or more 5G-S-TMSIs. In an embodiment of the disclosure, when the gNB transmits DCI whose CRC is scrambled by P-RNTI and the short message indicator in DCI indicates that scheduling information for paging (i.e., scheduling information for DL TB carrying paging message) is included in DCI where the paging message does not include the CN paging for one or more UE(s), and if the short message is also included in DCI (e.g., for the SI update notification, the emergency notification, or the like), the CN paging indicator in the short message is set to 0. The paging message for the CN paging includes a UE ID(s) for the CN paging, i.e., it includes one or more 5G-S-TMSIs.

In the disclosure, the UE ID for the CN paging is 5G-S-TMSI and the UE ID for an RAN paging is I-RNTI. However, any other UE IDs for an RAN paging and the CN paging can also be used in the methods proposed in this disclosure.

One example of short message including the CN paging indicator is as following Table 4:

TABLE 4

| Bit | Short Message |
| --- | --- |
| 1 | systemInfoModification<br>If set to 1: indication of a BCCH modification other than SIB6, SIB7 and SIB8. |

TABLE 4-continued

| Bit | Short Message |
| --- | --- |
| 2 | etwsAndCmasIndication<br>If set to 1: indication of an ETWS primary notification and/or an ETWS secondary notification and/or a CMAS notification. |
| 3 | CN Paging Indicator<br>If set to 1: indication that scheduled paging message includes at least CN paging |
| 4-8 | Reserved |

Hereinafter, the gNB operation according to the embodiment 1-2A is described.

The gNB has at least one of SI update/Emergency Notification or paging message for transmission.

If transmission of only SI update/Emergency Notification is needed
    The gNB sets short message indicator field to indicate that only short message is present in the DCI
    The gNB does not include scheduling information for paging in DCI
    The gNB includes short message in DCI
        CN paging indicator is set to 0 in short message.
        If indication of a BCCH modification other than SIB6, SIB7 and SIB8 is needed, systemInfoModification bit is set to 1
    If indication of an ETWS primary notification and/or an ETWS secondary notification and/or a CMAS notification is needed etwsAndCmasIndication bit is set to 1
    The gNB includes CN paging indicator in DCI and set it to 0. Alternately, gNB does not include CN paging indicator in DCI
    The gNB scrambles the CRC of DCI by P-RNTI
    The gNB transmits the DCI together with CRC over PDCCH monitoring occasion(s) of paging occasion or in PDCCH monitoring occasion(s) before paging occasion.

If transmission of only paging message is needed:
    The gNB includes scheduling information for paging in DCI
    if the paging message scheduled by this DCI includes only one or more UE IDs for CN paging (i.e., it includes one or more 5G-S-TMSIs):
        The gNB sets short message indicator field to indicate that both short message and scheduling information for paging is present in the DCI
        The gNB includes short message in DCI
        The gNB sets CN paging indicator in short message to 1.
    Else:
        The gNB sets short message indicator field to indicate that only scheduling information for paging is present in the DCI
        The gNB does not include short message in DCI
    The gNB scrambles the CRC of DCI by P-RNTI
    The gNB transmits the DCI together with CRC over PDCCH monitoring occasion(s) of paging occasion or in PDCCH monitoring occasion(s) before paging occasion.
    The gNB transmits the paging message over PDSCH If transmission of both SI update/Emergency Notification and paging message is needed:
    The gNB sets short message indicator field to indicate that both scheduling information for paging and short message is present in the DCI
    The gNB includes scheduling information for paging in DCI The gNB includes short message in DCI
  if the paging message scheduled by this DCI includes one or more UE IDs for CN paging (i.e., it includes only one or more 5G-S-TMSIs):
    The gNB sets CN paging indicator in short message to 1.
  Else:
    The gNB sets CN paging indicator in short message to 0.
The gNB scrambles the CRC of DCI by P-RNTI
The gNB transmits the DCI together with CRC over PDCCH monitoring occasion(s) of paging occasion or in PDCCH monitoring occasion(s) before paging occasion.
The gNB transmits the paging message over PDSCH Hereinafter, the UE operation according to the embodiment 1-2A is described.

The UE receives paging DCI or DCI whose CRC is scrambled by P-RNTI in monitored paging occasion where short message indicator in the DCI indicates that DCI includes scheduling information for paging.
  If the UE is in RRC_INACTIVE state:
    UE decodes the scheduled DL TB. The UE checks whether its I-RNTI or 5G-S-TMSI is included in paging message where paging message is received in decoded DL TB.
  Else, if the UE is in RRC_IDLE state:
  If CN paging indicator is supported (This can be indicated by network in paging configuration via system information or RRC signaling; in an embodiment, the UE may skip checking CN paging indicator support):
    If short message is included in DCI and CN paging indicator in the short message is set to 1
      UE decodes the scheduled DL TB. The UE checks whether its 5G-S-TMSI is included in paging message where paging message is received in decoded DL TB.
    else
      UE does not decode the scheduled DL TB.
  Else
    The UE decodes the scheduled DL TB. The UE checks whether its 5G-S-TMSI is included in paging message where paging message is received in decoded DL TB.

Embodiment 1-3

In one method of this disclosure, it is proposed to define a new P-RNTI (i.e., P-RNTI 2) in addition to legacy P-RNTI (i.e., P-RNTI 1)

In an embodiment of the disclosure, when the gNB transmits DCI for scheduling paging message where the paging message includes only RAN paging for one or more UE(s) and the short message is not included in DCI, CRC of DCI is scrambled by P-RNTI 2. The paging message for only an RAN paging includes only a UE ID(s) for the RAN paging, i.e., it includes only one or more I-RNTIs. In an embodiment of the disclosure, when the gNB transmits DCI for scheduling the paging message where the paging message includes the CN paging for one or more UE(s) (i.e., the paging message may include the RAN paging for zero, one or more UEs in addition to the CN paging), CRC of DCI is scrambled by P-RNTI 1. The paging message for the CN paging includes a UE ID(s) for the CN paging, i.e., it includes one or more 5G-S-TMSIs. In an embodiment of the disclosure, when the gNB transmits DCI where DCI includes short message (i.e., scheduling information for the paging message may or may not be included), CRC of DCI is scrambled by P-RNTI 1.

In an embodiment of the disclosure, when the gNB transmits DCI where DCI includes scheduling information for paging (i.e., scheduling information for DL TB carrying paging message) where the paging message includes only the RAN paging for one or more UE(s) and the short message is not included in DCI, CRC of DCI is scrambled by P-RNTI 2. The paging message for only the RAN paging includes only a UE ID(s) for the RAN paging, i.e., it includes only one or more I-RNTIs. In an embodiment of the disclosure, when the gNB transmits DCI where DCI includes scheduling information for paging (i.e., scheduling information for DL TB carrying the paging message) where the paging message includes CN paging for one or more UE(s) (i.e., the paging message may include the RAN paging for zero, one or more UEs in addition to CN paging), CRC of DCI is scrambled by P-RNTI 1. The paging message for the CN paging includes a UE ID(s) for the CN paging, i.e., it includes one or more 5G-S-TMSIs.

In an embodiment of the disclosure, when the gNB transmits DCI where the short message indicator in an DCI indicates that scheduling information for paging (i.e., scheduling information for DL TB carrying the paging message) is included in DCI where the paging message includes only an RAN paging for one or more UE(s) and a short message is not included in DCI, CRC of DCI is scrambled by P-RNTI 2. The paging message for only an RAN paging includes only a UE ID(s) for the RAN paging, i.e., it includes only one or more I-RNTIs. In an embodiment of the disclosure, when the gNB transmits DCI where the short message indicator in DCI indicates that scheduling information for paging (i.e., scheduling information for DL TB carrying the paging message) is included in DCI where the paging message includes the CN paging for one or more UE(s) (i.e., the paging message may include the RAN paging for zero, one or more UEs in addition to the CN paging), CRC of DCI is scrambled by P-RNTI 1. The paging message for the CN paging includes a UE ID(s) for the CN paging, i.e., it includes one or more 5G-S-TMSIs.

In the disclosure, the UE ID for the CN paging is 5G-S-TMSI and the UE ID for RAN paging is I-RNTI. However, any other UE IDs for the RAN paging and the CN paging can also be used in the methods proposed in this disclosure.

Hereinafter, the gNB operation according to the embodiment 1-3 is described.

The gNB has at least one of short message or paging message for transmission.
  If transmission of only short message is needed:
    The gNB sets short message indicator field to indicate that only short message is present in the DCI
    The gNB does not include scheduling information for paging in DCI
    The gNB includes short message in DCI
    The gNB scrambles the CRC of DCI by P-RNTI 1
    The gNB transmits the DCI together with CRC over PDCCH monitoring occasion(s) of paging occasion or in PDCCH monitoring occasion(s) before paging occasion.
  If transmission of only paging message is needed:
    The gNB sets short message indicator field to indicate that only scheduling information for paging is present in the DCI
    The gNB includes scheduling information for paging in DCI The gNB does not include short message in DCI
if the paging message scheduled by this DCI includes only one or more UE IDs for RAN paging (i.e., it includes only one or more I-RNTIs):
The gNB scrambles the CRC of DCI by P-RNTI 2
Else:
The gNB scrambles the CRC of DCI by P-RNTI 1
The gNB transmits the DCI together with CRC over PDCCH monitoring occasion(s) of paging occasion or in PDCCH monitoring occasion(s) before paging occasion.
The gNB transmits the paging message over PDSCH
If transmission of only paging message is needed (Alternate):
The gNB includes scheduling information for paging in DCI
The gNB does not include short message in DCI
if the paging message scheduled by this DCI includes only one or more UE IDs for RAN paging (i.e., it includes only one or more I-RNTIs):
short message indicator field is not included in DCI
The gNB scrambles the CRC of DCI by P-RNTI 2
Else:
The gNB sets short message indicator field to indicate that only scheduling information for paging is present in the DCI
The gNB scrambles the CRC of DCI by P-RNTI 1
The gNB transmits the DCI together with CRC over PDCCH in paging occasion
The gNB transmits the paging message over PDSCH
If transmission of both short message and paging message is needed:
The gNB sets short message indicator field to indicate that both scheduling information for paging and short message is present in the DCI
The gNB includes scheduling information for paging in DCI
The gNB includes short message in DCI
The gNB scrambles the CRC of DCI by P-RNTI 1
The gNB transmits the DCI together with CRC over PDCCH in paging occasion
The gNB transmits the paging message over PDSCH
Hereinafter, the UE operation according to the embodiment 1-3 is described.
If the UE is in RRC_INACTIVE state:
The UE monitors PDCCH addressed to P-RNTI 1 and P-RNTI 2 in paging occasion.
In RRC connection release message RAN can indicate whether P-RNTI 2 is supported or not. Note that the gNB sends RRC connection release message when the UE is in RRC_CONNECTED and upon receiving RRC connection release message including suspend configuration, the UE enters RRC_INACTIVE state and upon receiving RRC connection release message without suspend configuration, the UE enters RRC_IDLE state. Alternately, supported of P-RNTI 2 can be indicated in system information. If supported, the UE will monitor for PDCCH addressed to P-RNTI 2 in addition to P-RNTI 1. P-RNTI 2 can be reserved or signaled by the gNB.
If PDCCH addressed to P-RNTI 1 or P-RNTI 2 is received in PDCCH monitoring occasions in paging occasion or in PDCCH monitoring occasion(s) before paging occasion:
If short message indicator indicates that scheduling information for paging is included in DCI
The UE decodes the scheduled DL TB. The UE checks whether its I-RNTI or 5G-S-TMSI is included in paging message where paging message is received in decoded DL TB.
If short message indicator indicates that short message is included in DCI, the UE processes the short message.
Else, if the UE is in RRC_IDLE state:
The UE monitors PDCCH addressed to P-RNTI 1
If PDCCH addressed to P-RNTI 1 is received in paging occasion
If short message indicator indicates that scheduling information for paging is included in DCI
The UE decodes the scheduled DL TB. The UE checks whether its 5G-S-TMSI is included in paging message where paging message is received in decoded DL TB.
If short message indicator indicates that short message is included in DCI, the UE processes the short message.
Hereinafter, the UE operation (alternate) according to the embodiment 1-3 is also described.
If the UE is in RRC_INACTIVE state:
The UE monitors PDCCH addressed to P-RNTI 1 and P-RNTI 2 in paging occasion.
In RRC connection release message RAN can indicate whether P-RNTI 2 is supported or not. Note that the gNB sends RRC connection release message when the UE is in RRC_CONNECTED and upon receiving RRC connection release message including suspend configuration, the UE enters RRC_INACTIVE state and upon receiving RRC connection release message without suspend configuration, the UE enters RRC_IDLE state. Alternately, supported of P-RNTI 2 can be indicated in system information. If supported, the UE will monitor for PDCCH addressed to P-RNTI 2 in addition to P-RNTI 1.
If PDCCH addressed to P-RNTI 1 is received in paging occasion
If short message indicator indicates that scheduling information for paging is included in DCI
UE decodes the scheduled DL TB. The UE checks whether its I-RNTI or 5G-S-TMSI is included in paging message where paging message is received in decoded DL TB.
If short message indicator indicates that short message is included in DCI, the UE processes the short message.
If PDCCH addressed to P-RNTI 2 is received in paging occasion
The UE decodes the scheduled DL TB. The UE checks whether its I-RNTI is included in paging message where paging message is received in decoded DL TB.
Else, if the UE is in RRC_IDLE state:
The UE monitors PDCCH addressed to P-RNTI 1
If PDCCH addressed to P-RNTI 1 is received in paging occasion
If short message indicator indicates that scheduling information for paging is included in DCI
The UE decodes the scheduled DL TB. The UE checks whether its 5G-S-TMSI is included in paging message where paging message is received in decoded DL TB.
If short message indicator indicates that short message is included in DCI, the UE processes the short message.

Embodiment 2

SR Trigger for SCell Beam Failure Recovery (BFR)

According to current procedure, if UL-SCH resources are available for a new transmission, the UE does not trigger the Scheduling Request for SCell beam failure recovery upon beam failure detection.

Issue: If UL-SCH resources are available for a new transmission and if the UL-SCH resources can accommodate neither the SCell BFR MAC CE plus its subheader nor the truncated SCell BFR MAC CE plus its subheader as a result of logical channel prioritization, Scheduling Request is not triggered which will delay the BFR.

Figure 5:
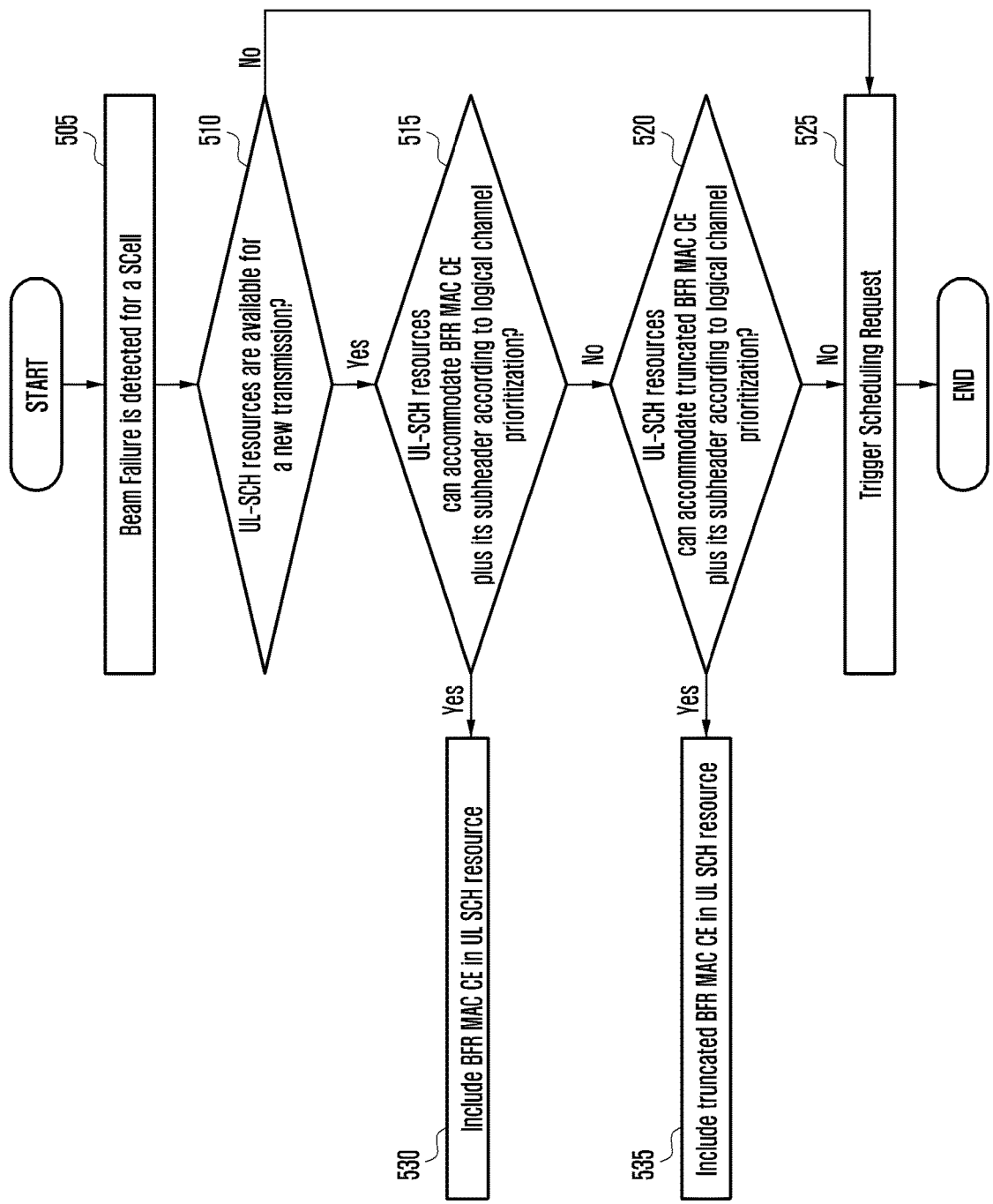
FIG. 5 illustrates a flowchart of triggering a scheduling request according to an embodiment of the disclosure.

To resolve the issue in one embodiment of this disclosure, it is proposed that if UL-SCH resources are available for a new transmission and if the UL-SCH resources can accommodate neither the SCell BFR MAC CE plus its subheader nor the truncated SCell BFR MAC CE plus its subheader as a result of logical channel prioritization, the UE shall trigger Scheduling request for SCell beam failure recovery as shown in FIG. 5.

FIG. 5 illustrates a flowchart of triggering a scheduling request according to an embodiment of the disclosure.

Referring to FIG. 5, for beam failure detection, the UE is configured with beam failure detection reference signal (BFD-RS) resource(s). On each BFD-RS resource, the UE estimates the downlink radio link quality and compare it to the thresholds Qout_LR. Qout: level at which the downlink radio link cannot be reliably received and corresponds to the block error rate (BLERout_LR of 10%). Beam Failure Instance indication is generated by physical layer when downlink radio link quality on all the configured BFD-RS resources is worse than Qout_LR. MAC layer detects beam failure based on this indication and initiate beam failure recovery.

The following UE variables are used for the beam failure detection procedure:

BFI_COUNTER: counter for beam failure instance indication which is initially set to 0.

The MAC entity (in the UE) shall trigger for SCell configured for beam failure detection:

1> if beam failure instance indication has been received from lower layers (i.e., a physical layer):
   2> start or restart the beamFailureDetectionTimer;
   2> increment BFI_COUNTER by 1;
   2> if BFI_COUNTER>=beamFailureInstanceMaxCount:
     3> trigger a BFR for this Serving Cell;
1> if the beamFailureDetectionTimer expires; or
1> if beamFailureDetectionTimer, beamFailureInstanceMaxCount, or any of the reference signals used for beam failure detection is reconfigured by upper layers associated with this Serving Cell:
   2> set BFI_COUNTER to 0.
1> if a PDCCH addressed to C-RNTI indicating uplink grant for a new transmission is received for the HARQ process used for the transmission of the SCell BFR MAC CE or truncated SCell BFR MAC CE which contains beam failure recovery information of this Serving Cell; or
1> if the SCell is deactivated:
   2> set BFI_COUNTER to 0;
   2> consider the Beam Failure Recovery procedure successfully completed and cancel all the triggered BFRs for this Serving Cell.

The MAC (in the UE) entity shall:
1> if the Beam Failure Recovery procedure determines that at least one BFR has been triggered and not cancelled (at operation 505 of FIG. 5):
   2> if UL-SCH resources are available for a new transmission at operation 510 and if the UL-SCH resources can accommodate the SCell BFR MAC CE plus its subheader as a result of logical channel prioritization at operation 515:
     3> instruct the Multiplexing and Assembly procedure to generate the SCell BFR MAC CE at operation 530.
   2> else, if UL-SCH resources are available for a new transmission at operation 510 and if the UL-SCH resources can accommodate the truncated SCell BFR MAC CE plus its subheader as a result of logical channel prioritization at operation 520:
     3> instruct the Multiplexing and Assembly procedure to generate the truncated SCell BFR MAC CE at operation 535.
   2> else:
     3> trigger the Scheduling Request for SCell beam failure recovery at operation 525.

The BFR MAC CEs consists of either:
SCell BFR MAC CE; or
Truncated SCell BFR MAC CE.

The BFR MAC CEs are identified by a MAC subheader with logical channel ID (LCID). BFR MAC CE has a variable size. It includes a bitmap and in ascending order based on the ServCellIndex, beam failure recovery information, i.e., octets containing candidate beam availability indication (AC) for SCells indicated in the bitmap. A single octet bitmap is used when the highest ServCellIndex of this MAC entity's SCell configured with beam failure detection is less than 8, otherwise four octets are used. In alternate embodiment of the disclosure, A single octet bitmap is used when the highest ServCellIndex of this MAC entity's SCell for which beam failure is detected is less than 8, otherwise four octets are used. In alternate embodiment of the disclosure, A single octet bitmap can also be used when the CO bit in bitmap is used for SpCell and SpCell beam failure is detected and BFR MAC CE cannot be accommodated in available UL grant. In alternate embodiment of the disclosure, A single octet bitmap can also be used when the CO bit in bitmap is used for SpCell and SpCell beam failure is detected and reported in BFR MAC CE.

The fields in the BFR MAC CEs are defined as follows:

$C_i$ (SCell BFR MAC CE): This field indicates beam failure detection and the presence of an octet containing the AC field for the SCell with ServCellIndex i as specified in TS 38.331 [5]. If the $C_i$ field set to 1, beam failure is detected and the octet containing the AC field is present for the SCell with ServCellIndex i. If the $C_i$ field set to 0, the beam failure is not detected and octet containing the AC field is not present for the SCell with ServCellIndex i. The octets containing the AC field are present in ascending order based on the ServCellIndex;

$C_i$ (Truncated SCell BFR MAC CE): This field indicates beam failure detection for the SCell with ServCellIndex i as specified in TS 38.331 [5]. If the $C_i$ field set to 1, beam failure is detected and the octet containing the AC field for the SCell with ServCellIndex i may be present. If the $C_i$ field set to 0, the beam failure is not detected and the octet containing the AC field is not present for the SCell with ServCellIndex i. The octets containing the AC field, if present, are included in ascending order based on the ServCellIndex. The number of octets containing the AC field included is maximized, while not exceeding the available grant size;

NOTE: The number of the octets containing the AC field in the Truncated SCell BFR format can be zero.

AC: This field indicates the presence of the Candidate RS ID field in this octet. If at least one of the SSBs with SS-RSRP above rsrp-ThresholdBFR amongst the SSBs in candidateBeamRSSCellList or the CSI-RSs with CSI-RSRP above rsrp-ThresholdBFR amongst the CSI-RSs in candidateBeamRSSCellList is available, the AC field is set to 1; otherwise, it is set to 0. If the AC field set to 1, the Candidate RS ID field is present. If the AC field set to 0, R bits are present instead;

Candidate RS ID: This field is set to the index of an SSB with SS-RSRP above rsrp-ThresholdBFR amongst the SSBs in candidateBeamRSSCellList or to the index of a CSI-RS with CSI-RSRP above rsrp-ThresholdBFR amongst the CSI-RSs in candidateBeamRSSCellList. The length of this field is 6 bits.

Figure 6:
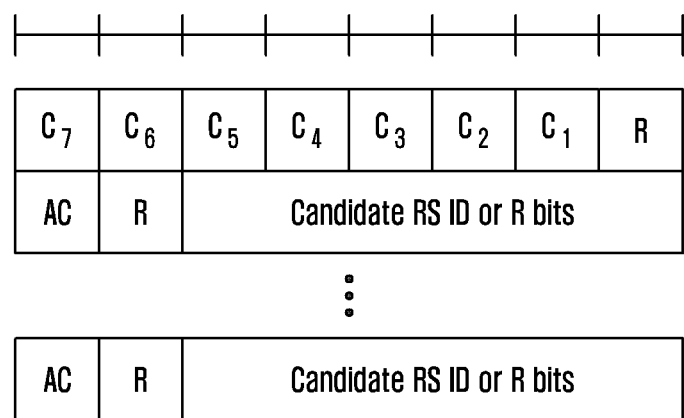
FIG. 6 illustrates a medium access control (MAC) control element (CE) structure according to an embodiment of the disclosure.

R: Reserved bit, set to 0;

FIG. 6 illustrates a MAC CE structure according to an embodiment of the disclosure. FIG. 6 illustrates an embodiment of SCell BFR and Truncated SCell BFR MAC CE with one octet Ci field.

Figure 7:
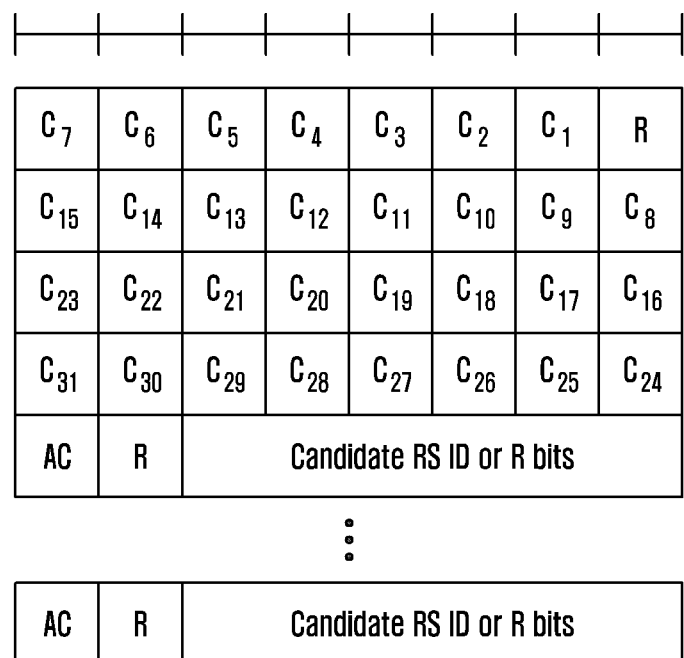
FIG. 7 illustrates a MAC CE structure according to an embodiment of the disclosure.

FIG. 7 illustrates a MAC CE structure according to an embodiment of the disclosure. FIG. 7 illustrates an embodiment of SCell BFR and Truncated SCell BFR MAC CE with 4 octets Ci field.

Embodiment 3

Referring to FIGS. 6 and 7, they illustrate BFR MAC CE Trigger for a SpCell.

The following UE variables are used for the beam failure detection procedure:

BFI_COUNTER: counter for beam failure instance indication which is initially set to 0.

The MAC entity shall trigger for SpCell configured for beam failure detection:

1> if beam failure instance indication has been received from lower layers:
2> start or restart the beamFailureDetectionTimer;
2> increment BFI_COUNTER by 1;
2> if BFI_COUNTER>=beamFailureInstanceMaxCount:
3> initiate a Random Access procedure on the SpCell
1> if the beamFailureDetectionTimer expires; or
1> if beamFailureDetectionTimer, beamFailureInstanceMaxCount, or any of the reference signals used for beam failure detection is reconfigured by upper layers associated with this Serving Cell:
2> set BFI_COUNTER to 0.
1> if the Random Access procedure is successfully completed:
2> set BFI_COUNTER to 0;
2> stop the beamFailureRecoveryTimer, if configured;
2> consider the Beam Failure Recovery procedure successfully completed.

Upon initiation of Random Access procedure on the SpCell for SpCell BFR:

The UE select RA type (2 step RA or 4 step RA) as described earlier

If RA type selected is 2 step:
For the first MSGA transmission within this Random Access procedure:
if the transmission is not being made for the CCCH logical channel:
indicate to the Multiplexing and assembly entity to include a C-RNTI MAC CE in the subsequent uplink transmission.
If this random access is initiated for BFR (or for SpCell BFR)
indicate to the Multiplexing and assembly entity to include a BFR MAC CE in the subsequent uplink transmission.
Else, If RA type selected is 4 step:
Upon receiving RAR after transmitting preamble selected from contention based preambles:
if this is the first successfully received Random Access Response within this Random Access procedure:
if the transmission is not being made for the CCCH logical channel:
indicate to the Multiplexing and assembly entity to include a C-RNTI MAC CE in the subsequent uplink transmission.
if the Random Access procedure was initiated for beam failure recovery (or for SpCell BFR):
indicate to the Multiplexing and assembly entity to include a BFR MAC CE in the subsequent uplink transmission.

Embodiment 4

Paging Monitoring in Extended DRX Cycle Based on CN Type

Paging in evolved universal terrestrial radio access network (E-UTRAN) connected to evolved packet core (EPC)

The 4th generation wireless communication system (also referred to as a E-UTRAN), consists of eNBs, providing the E-UTRA user plane (packet data convergence protocol (PDCP)/radio link control (RLC)/MAC/physical (PHY)) and control plane (e.g., an RRC) protocol terminations towards the UE. The eNBs are interconnected with each other by means of the X2 interface. The eNBs are also connected by means of the S1 interface to the EPC, more specifically to the MME (Mobility Management Entity) by means of the S1-MME interface and to the Serving Gateway (S-GW) by means of the S1-U interface. The S1 interface supports a many-to-many relation between MMEs/Serving Gateways and eNBs.

Paging using DRX Cycle in E-UTRAN Connected to EPC: In E-UTRAN, the UE may use DRX in idle mode in order to reduce power consumption. One Paging Occasion (PO) is a subframe where there may be P-RNTI transmitted on PDCCH addressing the paging message. The paging message is same for both RAN initiated paging and CN initiated paging. The UE initiates RRC Connection Resume procedure upon receiving RAN paging. If the UE receives a CN initiated paging in RRC_INACTIVE state, the UE moves to RRC_IDLE and informs NAS. One Paging Frame (PF) is one Radio Frame, which may contain one or multiple Paging Occasion(s). When DRX is used, the UE needs only to monitor one PO per DRX cycle. PF, PO, are determined by following formulae using the DRX parameters provided in System Information:

PF is given by following equation:

$$SFN \bmod T = (T \text{ div } N)*(UE\_ID \bmod N)$$

Index i_s pointing to PO from subframe pattern is derived from following calculation:

i_s=floor(UE_ID/N)mod Ns

The following Parameters are used for the calculation of the PF, i_s:
T: DRX cycle of the UE. T is determined by the shortest of the UE specific DRX value, if allocated by upper layers, and a default DRX value broadcast in system information. If the UE specific DRX is not configured by upper layers, the default value is applied. In RRC_I-NACTIVE state, T is determined by the shortest of the RAN paging cycle, the UE specific paging cycle, and the default paging cycle, if allocated by upper layers.
nB: 4T, 2T, T, T/2, T/4, T/8, T/16, T/32, T/64, T/128, and T/256.
N: min(T,nB)
Ns: max(1,nB/T)
UE_ID: IMSI mod 1024.

Paging using Extended DRX Cycle in E-UTRAN Connected to EPC

The UE may be configured by upper layers with an extended DRX (eDRX) cycle, $T_{eDRX}$. The UE may operate in extended DRX only if the UE is configured by upper layers and the cell indicates support for eDRX in System Information. A UE configured with eDRX monitors POs as defined earlier (i.e., based on the upper layer configured DRX value and a default DRX value), during a periodic Paging Time Window (PTW) configured for the UE or until a paging message including the UE's NAS identity is received for the UE during the PTW, whichever is earlier. The PTW is UE-specific and is determined by a Paging Hyperframe (PH), a starting position within the PH (PTW_start) and an ending position (PTW_end). PH, PTW_start and PTW_end are given by the following formulae:

The PH is the H-SFN satisfying the following equation:

H-SFN mod $T_{eDRX,H}$=(UE_ID_H mod $T_{eDRX,H}$), where

UE_ID_H: 10 most significant bits of the Hashed ID
$T_{eDRX,H}$: eDRX cycle of the UE in Hyper-frames, ($T_{eDRX,H}$=1, 2, . . . , 256 Hyper-frames) and configured by upper layers (i.e., a NAS).

PTW_start denotes the first radio frame of the PH that is part of the PTW and has SFN satisfying the following equation:

SFN=256*$i_{eDRX}$, where $i_{eDRX}$=floor(UE_ID_H/$T_{eDRX,H}$)mod 4

PTW_end is the last radio frame of the PTW and has SFN satisfying the following equation:

SFN=(PTW_start+L*100−1)mod 1024, where

L=Paging Time Window length (in seconds) configured by upper layers

Hashed ID is defined as follows:
Hashed_ID is Frame Check Sequence (FCS) for the bits b31, b30 . . . , b0 of S-TMSI
S-TMSI=<b39, b38, . . . , b0> MME Code (8 bits), M TMSI (32 bits)

The 32-bit FCS shall be the ones complement of the sum (modulo 2) of Y1 and Y2, where Y1 is the remainder of $x^k$ ($x^{31}+x^{30}+x^{29}+x^{28}+x^{27}+x^{26}+x^{25}+x^{24}+x^{23}+x^{22}+x^{21}+x^{20}+x^{19}+x^{18}+x^{17}+x^{16}+x^{15}+x^{14}+x^{13}+x^{12}+x^{11}+x^{10}+x^9+x^8+x^7+x^6+x^5+x^4+x^3+x^2+x^1+1$) divided (modulo 2) by the generator polynomial $x^{32}+x^{26}+x^{23}+x^{22}+x^{16}+x^{12}+x^{11}+x^{10}+x^8+x^7+x^5+x^4+x^2+x+1$, where k is 32; and Y2 is the remainder of Y3 divided (modulo 2) by the generator polynomial $x^{32}+x^{26}+x^{23}+x^{22}+x^{16}+x^{12}+x^{11}+x^{10}+x^8+x^7+x^5+x^4+x^2+x+1$, where Y3 is the product of $x^{32}$ by "b31, b30 . . . , b0 of S-TMSI", i.e., Y3 is the generator polynomial $x^{32}$ (b31*$x^{31}$+b30*$x^{30}$+ . . . +b0*1).

NOTE: The Y1 is 0xC704DD7B for any S-TMSI value.

Paging in NR connected to 5G Core (5GC)

The 5G or next generation radio access network (NG-RAN) based on NR consists of NG-RAN nodes where NG-RAN node is a the gNB, providing the NR user plane and the control plane protocol terminations towards the UE. The gNBs are also connected by means of the NG interfaces to the 5GC, more specifically to the access and mobility management function (AMF) by means of the NG-C interface and to the user plane function (UPF) by means of the NG-U interface.

Paging in E-UTRAN Connected to 5GC

The 5G or NG-RAN based on EUTRA consists of NG-RAN nodes where NG-RAN node is an ng-eNB, providing an E-UTRA user plane and control plane protocol terminations towards the UE. The ng-eNBs are also connected by means of the NG interfaces to the 5GC, more specifically to the AMF by means of the NG-C interface and to the UPF by means of the NG-U interface.

Issue: a multimode UE can support E-UTRAN connected to EPC, E-UTRAN connected to 5GC and NR cell connected to 5GC. If extended DRX cycle is configured by upper layers (i.e., a NAS), currently the UE determines PH, PTW_start and PTW_end based on Hashed_ID which is derived based on UE's S-TMSI. This works has currently extended DRX cycle is configured by only E-UTRA connected to EPC. An extended DRX cycle is not supported by 5GC and hence, when the UE is camped on the E-UTRA cell which is connected to 5GC or the NR Cell which is connected to 5GC, an extended DRX cycle is not configured. Support of extended DRX cycle in 5GC is targeted to be studied during 3GPP Release 17 standardization. If 5GC supported extended DRX cycle, current mechanism of using Hashed_ID derived based on a UE's S-TMSI does not work. Some enhancements are needed considering the CN type.

Extended DRX Cycle for a Multimode UE

In an embodiment of this disclosure, it is proposed that the UE configured to monitor paging according to an extended DRX cycle, selects a hashed identity from a first and second hashed identity for determining paging hyperframe and starting of the paging time window wherein the second hashed identity is selected if the UE is camped on E-UTRA connected to EPC and the first hashed identity is selected if the UE is camped on E-UTRA connected to 5GC or UE is camped on NR, where first hashed identity is the 10 MSBs of FCS for bits b31, b30 . . . , b0 of a 48 bit UE ID comprising of AMF Set ID (10 bits), AMF pointer (6 bits) and 5G TMSI (32 bits);

second hashed identity is the 10 MSBs of FCS for bits b31, b30 . . . , b0 of a 40 bit UE ID comprising of MME Code (8 bits), M TMSI (32 bits)

Figure 8:
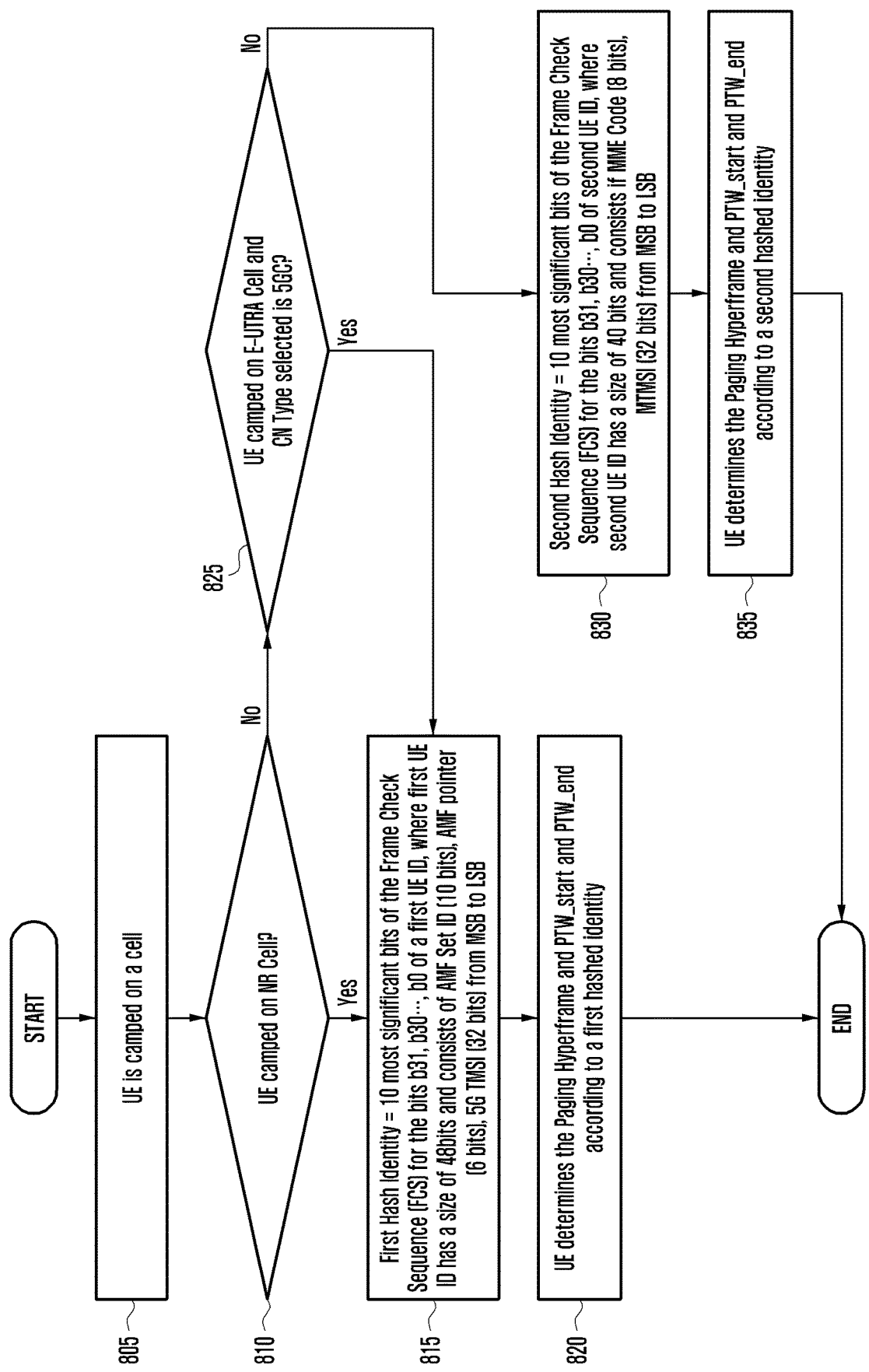
FIG. 8 illustrates a flowchart of determining paging related parameters according to an embodiment of the disclosure.

FIG. 8 illustrates a flowchart of determining paging related parameters according to an embodiment of the disclosure.

Referring to FIG. 8,
1. The UE is a NR/LTE dual mode UE.
2. The UE camps on one of NR cell, E-UTRA cell connected to EPC, E-UTRA cell connected to 5GC at operation 805.
3. If the UE is camped on NR Cell at operation 810:
   A. If the UE is configured to operate in extended DRX cycle (i.e., a camped cell supports extended DRX cycle and NAS/RRC configures extended DRX cycle parameters)
      i. The UE determines the Paging Hyperframe and PTW_start and PTW_end according to a first hashed identity at operations 815 and 820. The formulae for determining Paging Hyperframe and PTW_start and PTW_end is already explained earlier.
      ii. If the UE is in RRC IDLE, extended DRX cycle parameters (e.g., $T_{eDRX,H}$ and PTW length) is received by NAS from 5GC
      iii. If the UE is in RRC INACTIVE, an extended DRX cycle parameters (e.g., $T_{eDRX,H}$ and PTW length) is received by the UE from the gNB
4. Else, if the UE is camped on E-UTRA Cell at operation 810:
   A. If the UE is configured to operate in extended DRX cycle (i.e., a camped cell supports extended DRX cycle and NAS/RRC configures extended DRX cycle parameters)
      i. if the UE supports E-UTRA connected to 5GC and NAS indicates to use 5GC for the camped cell at operation 825:
         a) The UE determines the Paging Hyperframe and PTW_start and PTW_end according to a first hashed identity. The formulae for determining Paging Hyperframe and PTW_start and PTW_end is already explained earlier at operations 815 and 820.
         b) If the UE is in RRC IDLE, extended DRX cycle parameters (e.g., $T_{eDRX,H}$ and PTW length) is received by NAS from 5GC
         c) If the UE is in RRC INACTIVE, extended DRX cycle parameters (e.g., $T_{eDRX,H}$ and PTW length) is received by the UE from the ng-gNB
      ii) Else at operation 825
         a) The UE determines the Paging Hyperframe and PTW_start and PTW_end according to a second hashed identity at operations 830 and 835
         b) An extended DRX cycle parameters (e.g., $T_{eDRX,H}$ and PTW length) is received by NAS from EPC Where,
first hashed identity: 'n' most significant bits of the Frame Check Sequence (FCS) for the bits b31, b30 . . . , b0 of a first UE ID, where First UE ID has a size of 48 bits and consists of AMF Set ID (10 bits), AMF pointer (6 bits), 5G TMSI (32 bits) from MSB to LSB at operation 815. In an embodiment 'n' can be 10.
second hashed identity: 'n' most significant bits of the Frame Check Sequence (FCS) for the bits b31, b30 . . . , b0 of second UE ID, where second UE ID has a size of 40 bits and consists if MME Code (8 bits), M TMSI (32 bits) from MSB to LSB at operation 830. In an embodiment 'n' can be 10.

Figure 9:
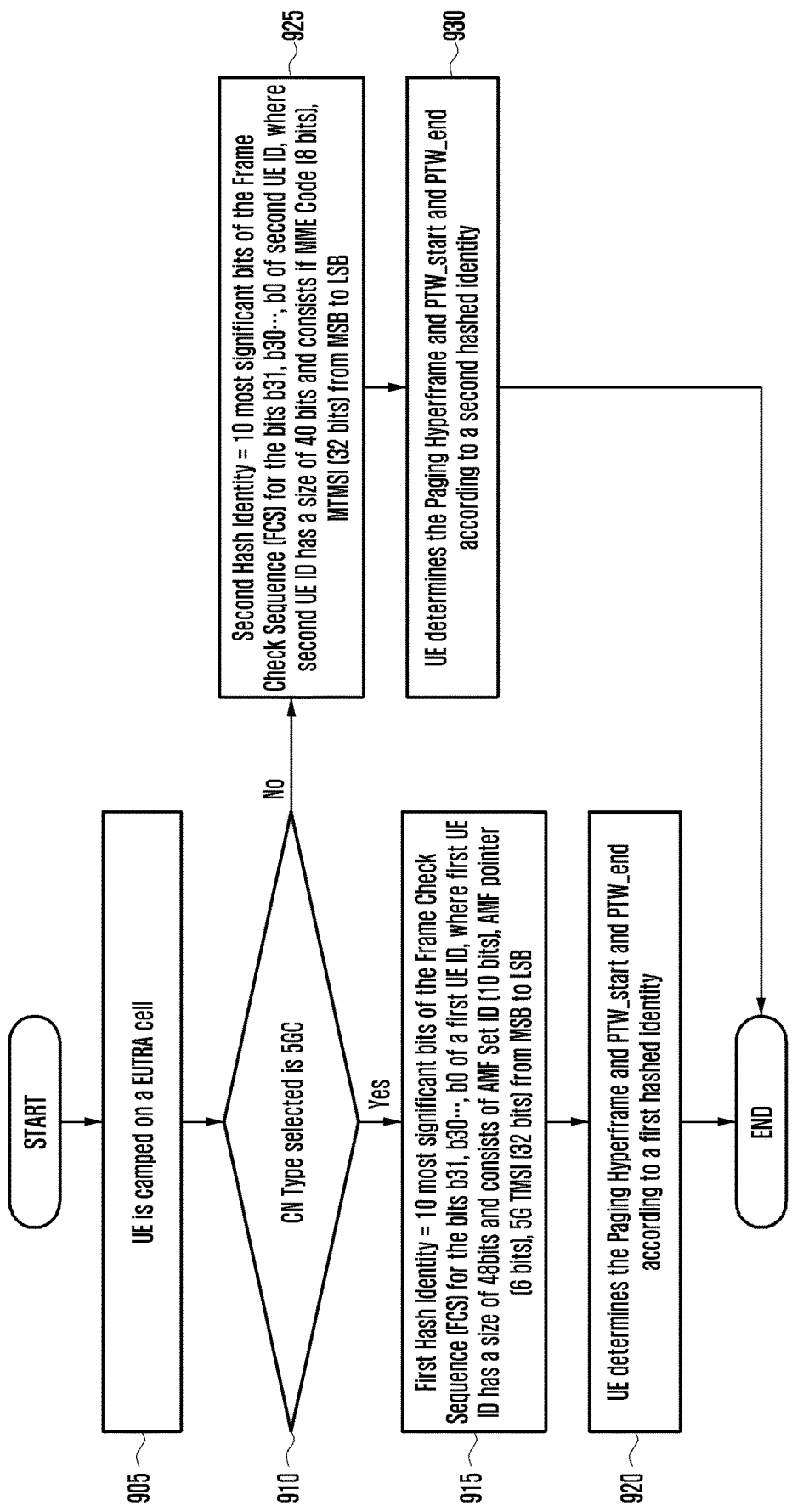
FIG. 9 illustrates a flowchart of determining paging related parameters according to an embodiment of the disclosure.

FIG. 9 illustrates a flowchart of determining paging related parameters according to an embodiment of the disclosure.

Referring to FIG. 9,
1. The UE supports E-UTRA only
2. The UE camps on one E-UTRA cell at operation 905.
3. An NAS indicates the CN type to use for the camped E-UTRA cell.
4. If the UE is configured to operate in extended DRX cycle (i.e., camped cell supports extended DRX cycle and NAS/RRC configures extended DRX cycle parameters)
   A. if the UE supports E-UTRA connected to 5GC and NAS indicates to use 5GC for the camped cell at operation 910:
      i. The UE determines the Paging Hyperframe and PTW_start and PTW_end according to a first hashed identity at operations 915 and 920. The formulae for determining Paging Hyperframe and PTW_start and PTW_end is already explained earlier.
      ii. If the UE is in RRC IDLE, extended DRX cycle parameters (e.g., T eDRX,H and PTW length) is received by NAS from 5GC
      iii. If the UE is in RRC INACTIVE, extended DRX cycle parameters (e.g., T eDRX,H and PTW length) is received by the UE from the ng-gNB
   B. Else at operation 910
      i. The UE determines the Paging Hyperframe and PTW_start and PTW_end according to a second hashed identity at operations 925 and 930. The formulae for determining Paging Hyperframe and PTW_start and PTW_end is already explained earlier.
      ii. extended DRX cycle parameters (e.g., T eDRX,H and PTW length) is received by NAS from EPC Where,
first hashed identity: 'n' most significant bits of the Frame Check Sequence (FCS) for the bits b31, b30 . . . , b0 of a first UE ID, where First UE ID has a size of 48 bits and consists of AMF Set ID (10 bits), AMF pointer (6 bits), 5G TMSI (32 bits) from MSB to LSB at operation 915. In an embodiment 'n' can be 10.
second hashed identity: 'n' most significant bits of the Frame Check Sequence (FCS) for the bits b31, b30 . . . , b0 of second UE ID, where second UE ID has a size of 40 bits and consists if MME Code (8 bits), M TMSI (32 bits) from MSB to LSB at operation 925. In an embodiment 'n' can be 10.

Embodiment 5

Handing Scheduling Request for NR V2X Communication 4G and 5G wireless communication system supports vehicular communication services. Vehicular communication services, represented by V2X services, can consist of the following four different types: V2V, V2I, V2N and V2P. In fifth generation (also referred to as a new radio (NR)) wireless communication system, V2X communication is being enhanced to support enhanced V2X use cases, which are broadly arranged into four use case groups:
1) Vehicles Platooning enables the vehicles to dynamically form a platoon travelling together. All the vehicles in the platoon obtain information from the leading vehicle to manage this platoon. These information allow the vehicles to drive closer than normal in a coordinated manner, going to the same direction and travelling together.

2) Extended Sensors enables the exchange of raw or processed data gathered through local sensors or live video images among vehicles, road site units, devices of pedestrian and V2X application servers. The vehicles can increase the perception of their environment beyond of what their own sensors can detect and have a more broad and holistic view of the local situation. High data rate is one of the key characteristics.

3) Advanced Driving enables semi-automated or full-automated driving. Each vehicle and/or RSU shares its own perception data obtained from its local sensors with vehicles in proximity and that allows vehicles to synchronize and coordinate their trajectories or maneuvers. Each vehicle shares its driving intention with vehicles in proximity too.

4) Remote Driving enables a remote driver or a V2X application to operate a remote vehicle for those passengers who cannot drive by themselves or remote vehicles located in dangerous environments. For a case where variation is limited and routes are predictable, such as public transportation, driving based on cloud computing can be used. High reliability and low latency are the main requirements.

Figure 10:
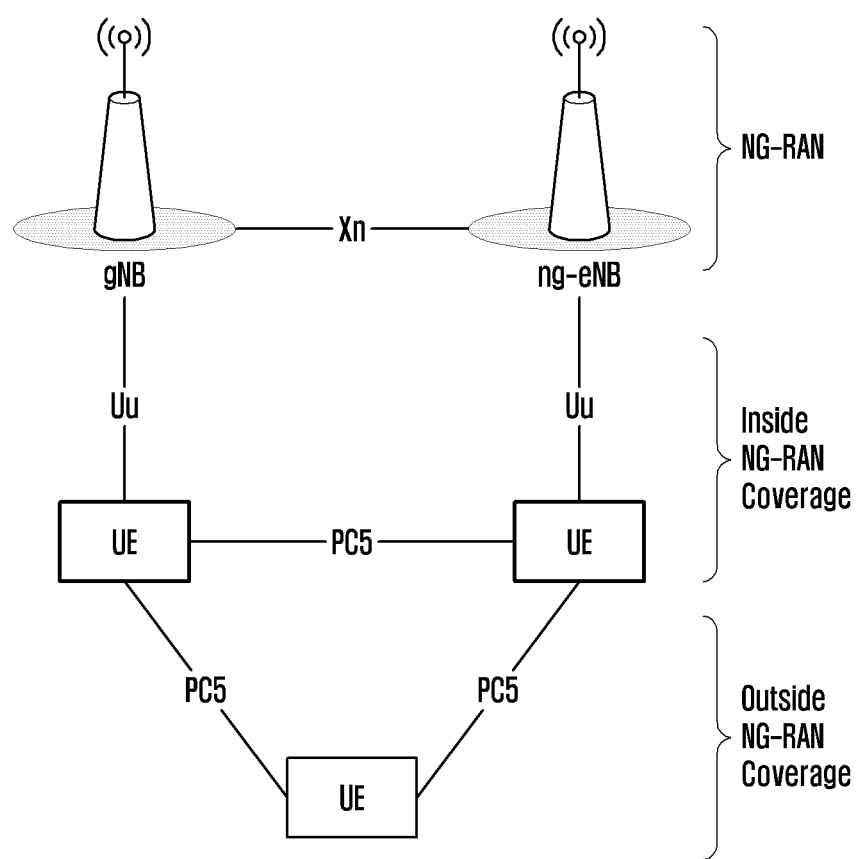
FIG. 10 illustrates a radio access node (RAN) architecture according to an embodiment of the disclosure.

FIG. 10 illustrates a radio access node (RAN) architecture according to an embodiment of the disclosure.

Referring to FIG. 10, V2X services can be provided by PC5 interface and/or Uu interface. Support of V2X services via PC5 interface is provided by NR sidelink communication or V2X sidelink communication, which is a mode of communication whereby UEs can communicate with each other directly over the PC5 interface using NR technology or EUTRA technology respectively without traversing any network node. This communication mode is supported when the UE is served by RAN and when the UE is outside of RAN coverage. Only the UEs authorized to be used for V2X services can perform NR or V2X sidelink communication. The NG-RAN architecture supports the PC5 interface as illustrated in FIG. 10. Sidelink transmission and reception over the PC5 interface are supported when the UE is inside NG-RAN coverage, irrespective of which RRC state the UE is in, and when the UE is outside NG-RAN coverage. Support of V2X services via the PC5 interface can be provided by NR Sidelink Communication and/or V2X Sidelink Communication. NR Sidelink Communication may be used to support other services than V2X services.

NR or V2X Sidelink Communication can support three types of transmission modes. Unicast transmission, characterized by support of at least one PC5-RRC connection between peer UEs, Transmission and reception of control information and user traffic between peer UEs in sidelink; Support of sidelink HARQ feedback, Support of RLC AM, and Support of sidelink RLM for both peer UEs to detect RLF. Groupcast transmission, characterized by: Transmission and reception of user traffic among UEs belonging to a group in sidelink, Support of sidelink HARQ feedback. Broadcast transmission, characterized by: Transmission and reception of user traffic among UEs in sidelink.

The AS protocol stack for the control plane in the PC5 interface consists of RRC, PDCP, RLC and MAC sublayer, and the physical layer. The AS protocol stack for user plane in the PC5 interface consists of Service Data Adaptation Protocol (SDAP), PDCP, RLC and MAC sublayer, and the physical layer. Sidelink Radio bearers (SLRB) are categorized into two groups: sidelink data radio bearers (SL DRB) for user plane data and sidelink signaling radio bearers (SL SRB) for control plane data. Separate SL SRBs using different sidelink control channels (SCCHs) are configured for PC5-RRC and PC5-S signaling respectively.

The MAC sublayer provides the following services and functions over the PC5 interface: Radio resource selection, Packet filtering, Priority handling between uplink and sidelink transmissions for a given UE, Sidelink CSI reporting. With logical channel prioritization (LCP) restrictions in MAC, only sidelink logical channels belonging to the same destination can be multiplexed into a MAC PDU for every unicast, groupcast and broadcast transmission which is associated to the destination. NG-RAN can also control whether a sidelink logical channel can utilize the resources allocated to a configured sidelink grant Type 1. For packet filtering, a sidelink shared channel (SL-SCH) MAC header including portions of both Source Layer-2 ID and a Destination Layer-2 ID is added to each MAC PDU as specified in subclause 8.x. LCID included within a MAC subheader uniquely identifies a logical channel within the scope of the Source Layer-2 ID and Destination Layer-2 ID combination. The following logical channels are used in sidelink:

Sidelink Control Channel (SCCH): a sidelink channel for transmitting control information from one UE to other UE(s);

Sidelink Traffic Channel (STCH): a sidelink channel for transmitting user information from one UE to other UE(s);

Sidelink Broadcast Control Channel (SBCCH): a sidelink channel for broadcasting sidelink system information from one UE to other UE(s).

The following connections between logical channels and transport channels exist:

SCCH can be mapped to SL-SCH;

STCH can be mapped to SL-SCH;

SBCCH can be mapped to sidelink broadcast channel (SL-BCH).

The RRC sublayer provides the following services and functions over the PC5 interface:

Transfer of a PC5-RRC message between peer UEs;

Maintenance and release of a PC5-RRC connection between two UEs;

Detection of sidelink radio link failure for a PC5-RRC connection.

A PC5-RRC connection is a logical connection between two UEs for a pair of Source and Destination Layer-2 IDs which is considered to be established after a corresponding PC5 unicast link is established as specified in TS 23.287. There is one-to-one correspondence between the PC5-RRC connection and the PC5 unicast link. A UE may have multiple PC5-RRC connections with one or more UEs for different pairs of Source and Destination Layer-2 IDs. Separate PC5-RRC procedures and messages are used for a UE to transfer UE capability and sidelink configuration including SLRB configuration to the peer UE. Both peer UEs can exchange their own UE capability and sidelink configuration using separate bi-directional procedures in both sidelink directions. If it is not interested in sidelink transmission, if sidelink RLF on the PC5-RRC connection is declared, or if the Layer-2 link release procedure is completed as specified in TS 23.287, the UE releases the PC5-RRC connection.

The UE can operate in two modes for resource allocation in sidelink:

Scheduled resource allocation (also referred to as mode 1), characterized by:

The UE needs to be RRC_CONNECTED in order to transmit data;

NG-RAN schedules transmission resources.

UE autonomous resource selection (also referred to as mode 2), characterized by:
- The UE can transmit data when inside NG-RAN coverage, irrespective of which RRC state the UE is in, and when outside NG-RAN coverage;
- The UE autonomously selects transmission resources from a pool of resources.

For NR sidelink communication, the UE performs sidelink transmissions only on a single carrier.

Scheduled Resource Allocation: NG-RAN can dynamically allocate resources to the UE via the SL-RNTI on PDCCH(s) for NR sidelink Communication. In addition, NG-RAN can allocate sidelink resources to the UE with two types of configured sidelink grants:
- With type 1, RRC directly provides the configured sidelink grant for NR sidelink communication
- With type 2, RRC provides the periodicity of the configured sidelink grant while PDCCH can either signal and activate the configured sidelink grant, or deactivate it. The PDCCH provides the actual grant (i.e., resources) to be used. The PDCCH is addressed to SL-CS-RNTI for NR sidelink communication and SL Semi-Persistent Scheduling V-RNTI for V2X sidelink communication.

For the UE performing NR sidelink communication, there can be more than one configured sidelink grant activated at a time on the carrier configured for sidelink transmission. When beam failure or physical layer problem occurs on NR Uu, the UE can continue using the configured sidelink grant Type 1. During handover, the UE can be provided with configured sidelink grants via handover command, regardless of the type. If provided, the UE activates the configured sidelink grant Type 1 upon reception of the handover command. The UE can send sidelink buffer status report to support scheduler operation in NG-RAN. The sidelink buffer status reports refer to the data that is buffered in for a group of logical channels (LCG) per destination in the UE. Eight LCGs are used for reporting of the sidelink buffer status reports. Two formats, which are SL BSR and truncated SL BSR, are used.

UE sends SL BSR for dynamic resource allocation, in following cases
- SL data, for a sidelink logical channel of a proximity service (ProSe) Destination, becomes available for transmission in the RLC entity or in the PDCP entity and either the data belongs to a sidelink logical channel with higher priority than the priorities of the sidelink logical channels which belong to any LCG belonging to the same ProSe Destination and for which data is already available for transmission, or there is currently no data available for transmission for any of the sidelink logical channels belonging to the same ProSe Destination, in which case the Sidelink BSR is referred below to as "Regular Sidelink BSR";
- UL resources are allocated and number of padding bits remaining after a Padding BSR has been triggered is equal to or larger than the size of the Sidelink BSR MAC control element containing the buffer status for at least one LCG of a ProSe Destination plus its subheader, in which case the Sidelink BSR is referred below to as "Padding Sidelink BSR";
- retx-BSR-TimerSL expires and the MAC entity has data available for transmission for any of the sidelink logical channels, in which case the Sidelink BSR is referred below to as "Regular Sidelink BSR";
- periodic-BSR-TimerSL expires, in which case the Sidelink BSR is referred below to as "Periodic Sidelink BSR";

UE Autonomous Resource Allocation: The UE autonomously selects sidelink grant from a pool of resources provided by broadcast system information or dedicated signaling while inside NG-RAN coverage or by pre-configuration while outside NG-RAN coverage.

For NR sidelink communication, the pools of resources can be provided for a given validity area where the UE does not need to acquire a new pool of resources while moving within the validity area, at least when this pool is provided by SIB (e.g., reuse valid area of NR SIB). NR SIB validity mechanism is reused to enable validity area for SL resource pool configured via broadcasted system information. The UE is allowed to temporarily use UE autonomous resource selection with random selection for sidelink transmission based on configuration of the exceptional transmission resource pool.

For V2X sidelink transmission, during handover, transmission resource pool configurations including exceptional transmission resource pool for the target cell can be signaled in the handover command to reduce the transmission interruption. In this way, the UE may use the V2X sidelink transmission resource pools of the target cell before the handover is completed as long as either synchronization is performed with the target cell in case eNB is configured as synchronization source or synchronization is performed with Global Navigation Satellite Systems (GNSS) in case GNSS is configured as synchronization source. If the exceptional transmission resource pool is included in the handover command, the UE uses randomly selected resources from the exceptional transmission resource pool, starting from the reception of handover command. If the UE is configured with scheduled resource allocation in the handover command, the UE continues to use the exceptional transmission resource pool while the timer associated with handover is running. If the UE is configured with autonomous resource selection in the target cell the UE continues to use the exceptional transmission resource pool until the sensing results on the transmission resource pools for autonomous resource selection are available. For exceptional cases (e.g., during RLF, during transition from RRC IDLE to RRC CONNECTED or during change of dedicated V2X sidelink resource pools within a cell), the UE may select resources in the exceptional pool provided in serving cell's SIB21 or in dedicated signaling based on random selection, and uses them temporarily. During cell reselection, the RRC_IDLE UE may use the randomly selected resources from the exceptional transmission resource pool of the reselected cell until the sensing results on the transmission resource pools for autonomous resource selection are available.

A regular SL BSR is triggered if the UE is configured with mode 1 (i.e., a MAC entity has a SL-RNTI or SL-CS-RNTI) and SL data, for a logical channel of a Destination, becomes available to the MAC entity, and either of the following condition is met.
- This SL data belongs to a logical channel with higher priority than the priorities of the logical channels containing available SL data which belong to any LCG belonging to the same Destination.
- Alternatively, none of the logical channels which belong to an LCG belonging to the same Destination contains any available SL data.

For Regular SL-BSR, the MAC entity shall:
- if the SL-BSR is triggered for a logical channel for which logicalChannelSR-DelayTimerAppliedSL with value true is configured by the gNB: start or restart the logicalChannelSR-DelayTimerSL.

else: if running, stop the logicalChannelSR-DelayTimerSL.

Issue: According to current procedure, for mode 1, SR configuration is signaled by the gNB for SL BSR. When regular SL BSR is triggered and logicalChannelSR-DelayTimerSL is not running, the UE triggers SR if there is no UL-SCH resource available for a new transmission, or if the MAC entity is configured with configured uplink grant(s). If UL SCH resources are available for a new transmission and SL BSR MAC CE can be included in the available UL SCH resources, SR is not triggered. In some cases this may delay the delivery of SL BSR to network as available UL SCH resources may be present after a long time.

Option 1:
If a Regular SL-BSR has been triggered and logicalChannelSR-DelayTimerSL is not running:
  if there is no UL-SCH resource available for a new transmission; or
  if the MAC entity is configured with configured uplink grant(s); or
  if the UL-SCH resources available for a new transmission and if the physical sidelink shared channel (PSSCH) duration for the sidelink transmission is smaller than the PUSCH transmission duration associated with the UL-SCH resources or SCS configured for the sidelink transmission is larger than or not equal to SCS of UL-SCH resource
  trigger a Scheduling Request.

SCS for sidelink transmission is configured in SL BWP/LCH configuration. SL BWP/LCH configuration is signaled by the gNB in RRC reconfiguration message or system information. PSSCH duration for the sidelink transmission is pre-defined or signaling by the gNB in resource pool configuration or in SL BWP/LCH configuration. In an embodiment of the disclosure, PSSCH is transmitted in a slot configured for SL. The number of OFDM symbols used for PSSCH transmission is the number of OFDM symbols configured for SL in a slot. This configuration is provided in SL BWP configuration.

Option 2:
If a Regular SL-BSR has been triggered and logicalChannelSR-DelayTimerSL is not running:
  if there is no UL-SCH resource available for a new transmission; or
  if the MAC entity is configured with configured uplink grant(s); or
  if the UL-SCH resources available for a new transmission and if the PSSCH duration configured for the sidelink transmission is smaller than the PUSCH transmission duration associated to the UL-SCH resources
  trigger a Scheduling Request.

SCS for sidelink transmission is configured in SL BWP/LCH configuration. SL BWP/LCH configuration is signaled by the gNB in RRC reconfiguration message or system information. PSSCH duration for the sidelink transmission is pre-defined or signaling by the gNB in resource pool configuration or in SL BWP/LCH configuration. In an embodiment of the disclosure, PSSCH is transmitted in a slot configured for SL. The number of OFDM symbols used for PSSCH transmission is the number of OFDM symbols configured for SL in a slot. This configuration is provided in SL BWP configuration.

Option 3:
If a Regular SL-BSR has been triggered and logicalChannelSR-DelayTimerSL is not running:
  if there is no UL-SCH resource available for a new transmission; or
  if the MAC entity is configured with configured uplink grant(s); or
  if the UL-SCH resources are available for a new transmission and if PUCCH resource for SR transmission occurs (in time) before the available UL SCH resource, trigger a Scheduling Request.

PUCCH resource for SR transmission corresponds to PUCCH resource corresponding to SR configuration of SL LCH that triggered the SL BSR.

Figure 11:
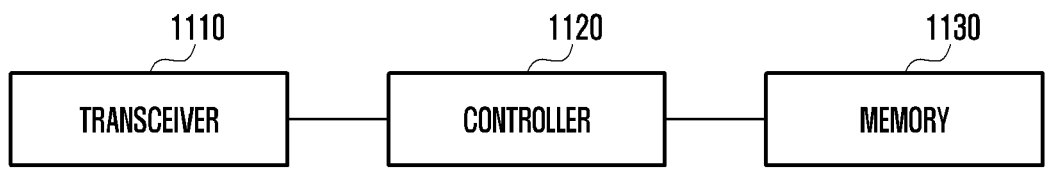
FIG. 11 is a block diagram of a terminal according to an embodiment of the disclosure.

FIG. 11 is a block diagram of a terminal according to an embodiment of the disclosure.

Referring to FIG. 11, a terminal includes a transceiver 1110, a controller 1120 (for example, at least one processor) and a memory 1130. The controller 1120 may refer to a circuitry, an application-specific integrated circuit (ASIC), or at least one processor. The transceiver 1110, the controller 1120 and the memory 1130 are configured to perform the operations of the terminal illustrated in the figures, e.g., FIGS. 1A to 10, or described above. Although the transceiver 1110, the controller 1120 and the memory 1130 are shown as separate entities, they may be realized as a single entity like a single chip. Alternatively, the transceiver 1110, the controller 1120 and the memory 1130 may be electrically connected to or coupled with each other.

The transceiver 1110 may transmit and receive signals to and from other network entities, e.g., a base station.

The controller 1120 may control the terminal to perform functions according to one of the embodiments described above. For example, the controller 1120 controls the transceiver 1110 and/or memory 1130 to perform RRC idle mode related operations according to various embodiments of the disclosure.

In an embodiment of the disclosure, the operations of the terminal may be implemented using the memory 1130 storing corresponding program codes. Specifically, the terminal may be equipped with the memory 1130 to store program codes implementing desired operations. To perform the desired operations, the controller 1120 may read and execute the program codes stored in the memory 1130 by using at least one processor or a central processing unit (CPU).

Figure 12:
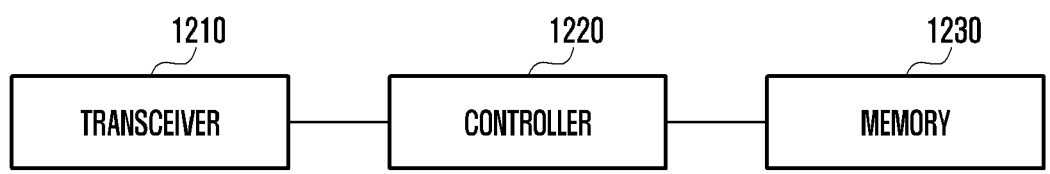
FIG. 12 is a block diagram of a base station according to an embodiment of the disclosure.

FIG. 12 is a block diagram of a base station according to an embodiment of the disclosure.

Referring to FIG. 12, a base station includes a transceiver 1210, a controller 1220 and a memory 1230. The controller 1220 may refer to a circuitry, an application-specific integrated circuit (ASIC), or at least one processor. The transceiver 1210, the controller 1220 and the memory 1230 are configured to perform the operations of the base station illustrated in the figures, e.g., FIGS. 1A to 10, or described above. Although the transceiver 1210, the controller 1220 and the memory 1230 are shown as separate entities, they may be realized as a single entity like a single chip. Alternatively, the transceiver 1210, the controller 1220 and the memory 1230 may be electrically connected to or coupled with each other.

The transceiver 1210 may transmit and receive signals to and from other network entities, e.g., a terminal.

The controller 1220 may control the base station to perform functions according to one of the embodiments described above. For example, the controller 1220 controls the transceiver 1210 and/or memory 1230 to perform RRC idle mode related operations according to various embodiments of the disclosure.

In an embodiment of the disclosure, the operations of the base station may be implemented using the memory 1230 storing corresponding program codes. Specifically, the base station may be equipped with the memory 1230 to store program codes implementing desired operations. To perform the desired operations, the controller 1220 may read and execute the program codes stored in the memory 1230 by using at least one processor or a central processing unit (CPU).

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:
    receiving, from a base station, configuration information on a reference signal for identifying beam failure recovery (BFR);
    determining that the BFR for a serving cell associated with the base station is triggered based on the configuration information and is not cancelled;
    identifying whether an uplink shared channel (UL-SCH) resource is available for a new transmission;
    in case that the UL-SCH resource is available for the new transmission, identifying whether the UL-SCH resource is able to accommodate a non-truncated BFR medium access control (MAC) control element (CE) plus a subheader for the non-truncated BFR MAC CE;
    in case that the UL-SCH resource is not able to accommodate the non-truncated BFR MAC CE plus the subheader for the non-truncated BFR MAC CE, identifying whether the UL-SCH resource is able to accommodate a truncated BFR MAC CE plus a subheader for the truncated BFR MAC CE; and
    in case that the UL-SCH resource is not able to accommodate the truncated BFR MAC CE plus the subheader for the truncated BFR MAC CE, triggering a scheduling request (SR) for the BFR for the serving cell.

2. The method of claim 1, further comprising:
    in case that the UL-SCH resource is able to accommodate the non-truncated BFR MAC CE plus the subheader for the non-truncated BFR MAC CE, generating the non-truncated BFR MAC CE.

3. The method of claim 2, further comprising:
    in case that the UL-SCH resource is not able to accommodate the non-truncated BFR MAC CE plus the subheader for the non-truncated BFR MAC CE, and the UL-SCH resource is able to accommodate the truncated BFR MAC CE plus the subheader for the truncated BFR MAC CE, generating the truncated BFR MAC CE.

4. The method of claim 3, further comprising:
    transmitting a MAC protocol data unit (PDU) including the non-truncated BFR MAC CE or the truncated BFR MAC CE.

5. The method of claim 1, wherein the serving cell includes a secondary cell (SCell).

6. A terminal in a wireless communication system, the terminal comprising:
    a transceiver configured to transmit and receive a signal; and
    a processor configured to:
        receive, from a base station, configuration information on a reference signal for identifying beam failure recovery (BFR),
        determine that the BFR for a serving cell associated with the base station is triggered based on the configuration information and is not cancelled,
        identify whether an uplink shared channel (UL-SCH) resource is available for a new transmission,
        in case that the UL-SCH resource is available for the new transmission, identify whether the UL-SCH resource is able to accommodate a non-truncated BFR medium access control (MAC) control element (CE) plus a subheader for the non-truncated BFR MAC CE,
        in case that the UL-SCH resource is not able to accommodate the non-truncated BFR MAC CE plus the subheader for the non-truncated BFR MAC CE, identify whether the UL-SCH resource is able to accommodate a truncated BFR MAC CE plus a subheader for the truncated BFR MAC CE, and
        in case that the UL-SCH resource is not able to accommodate the truncated BFR MAC CE plus the subheader for the truncated BFR MAC CE, trigger a scheduling request (SR) for the BFR for the serving cell.

7. The terminal of claim 6, wherein the processor is further configured to:
    in case that the UL-SCH resource is able to accommodate the non-truncated BFR MAC CE plus the subheader for the non-truncated BFR MAC CE, generate the non-truncated BFR MAC CE.

8. The terminal of claim 7, wherein the processor is further configured to:
    in case that the UL-SCH resource is not able to accommodate the non-truncated BFR MAC CE plus the subheader for the non-truncated BFR MAC CE, and the UL-SCH resource is able to accommodate the truncated BFR MAC CE plus the subheader for the truncated BFR MAC CE, generate the truncated BFR MAC CE.

9. The terminal of claim 8, wherein the processor is further configured to:
    transmit a MAC protocol data unit (PDU) including the non-truncated BFR MAC CE or the truncated BFR MAC CE.

10. The terminal of claim 6, wherein the serving cell includes a secondary cell (SCell).

11. A method performed by a base station in a wireless communication system, the method comprising:
    transmitting, to a terminal, configuration information on a reference signal for identifying beam failure recovery (BFR);
    transmitting, to the terminal, information for an uplink shared channel (UL-SCH) resource; and
    receiving, from the terminal, a scheduling request (SR) for the BFR for a serving cell based on the configuration information,
    wherein the UL-SCH resource is available for a new transmission and the UL-SCH is not able to accommodate either a non-truncated BFR medium access control (MAC) control element (CE) plus a subheader for the non-truncated BFR MAC CE or a truncated BFR MAC CE plus the subheader for the truncated BFR MAC CE.

12. The method of claim 11, further comprising:
    in case that the UL-SCH resource is able to accommodate the non-truncated BFR MAC CE plus the subheader for the non-truncated BFR MAC CE, receiving, from the terminal, the non-truncated BFR MAC CE.

13. The method of claim 12, further comprising:
    in case that the UL-SCH resource is not able to accommodate the non-truncated BFR MAC CE plus the subheader for the non-truncated BFR MAC CE, and the UL-SCH resource is able to accommodate the truncated BFR MAC CE plus the subheader for the truncated BFR MAC CE, receiving, from the terminal, the truncated BFR MAC CE.

14. The method of claim 13, wherein the non-truncated BFR MAC CE or the truncated BFR MAC CE is received by a MAC protocol data unit (PDU).

15. The method of claim 11, wherein the serving cell includes a secondary cell (SCell).

16. A base station in a wireless communication system, the base station comprising:
   a transceiver configured to transmit and receive a signal; and
   a processor configured to:
      transmit, to a terminal, configuration information on a reference signal for identifying beam failure recovery (BFR),
      transmit, to the terminal, information for an uplink shared channel (UL-SCH) resource, and
      receive, from the terminal, a scheduling request (SR) for the BFR for a serving cell,
   wherein the UL-SCH resource is available for a new transmission and the UL-SCH is not able to accommodate either a non-truncated BFR medium access control (MAC) control element (CE) plus a subheader for the non-truncated BFR MAC CE or a truncated BFR MAC CE plus the subheader for the truncated BFR MAC CE.

17. The base station of claim 16, wherein the processor is further configured to:
   in case that the UL-SCH resource is able to accommodate the non-truncated BFR MAC CE plus the subheader for the non-truncated BFR MAC CE, receive, from the terminal, the non-truncated BFR MAC CE.

18. The base station of claim 17, wherein the processor is further configured to:
   in case that the UL-SCH resource is not able to accommodate the non-truncated BFR MAC CE plus the subheader for the non-truncated BFR MAC CE, and the UL-SCH resource is able to accommodate the truncated BFR MAC CE plus the subheader for the truncated BFR MAC CE, receive, from the terminal, the truncated BFR MAC CE.

19. The base station of claim 18, wherein the non-truncated BFR MAC CE or the truncated BFR MAC CE is received by a MAC protocol data unit (PDU).

20. The base station of claim 16, wherein the serving cell includes a secondary cell (SCell).

* * * * *